(12) United States Patent
Kakihara et al.

(10) Patent No.: US 7,836,349 B2
(45) Date of Patent: Nov. 16, 2010

(54) STORAGE CONTROL DEVICE AND ENCLOSURE-UNIT POWER CONTROL METHOD

(75) Inventors: Shinobu Kakihara, Odawara (JP); Mitsuhide Sato, Ooiso (JP)

(73) Assignee: Hitachi, Ltd., Tokyo (JP)

( * ) Notice: Subject to any disclaimer, the term of this patent is extended or adjusted under 35 U.S.C. 154(b) by 382 days.

(21) Appl. No.: 12/007,645

(22) Filed: Jan. 14, 2008

(65) Prior Publication Data

US 2009/0013215 A1    Jan. 8, 2009

(30) Foreign Application Priority Data

Jul. 4, 2007    (JP) ............................. 2007-176401

(51) Int. Cl.
  *G06F 11/00*    (2006.01)
(52) U.S. Cl. ............................. 714/42; 714/22; 714/43; 714/47; 714/48; 360/69; 361/679.4
(58) Field of Classification Search .................. 714/22, 714/42, 43; 360/69; 361/679.4
  See application file for complete search history.

(56) References Cited

U.S. PATENT DOCUMENTS

| | | | | |
|---|---|---|---|---|
| 5,784,641 | A * | 7/1998 | Sueyoshi et al. ................. | 710/2 |
| 6,012,124 | A * | 1/2000 | Kamo et al. ................. | 711/114 |
| 7,111,087 | B2 * | 9/2006 | Jiang et al. ..................... | 710/36 |
| 7,519,869 | B2 * | 4/2009 | Mizuno et al. ................. | 714/42 |
| 2003/0193732 | A1 * | 10/2003 | Hakamata et al. ............. | 360/69 |
| 2003/0217300 | A1 * | 11/2003 | Fukumori et al. ............ | 713/300 |
| 2004/0078663 | A1 * | 4/2004 | Inaba .......................... | 714/22 |
| 2006/0193073 | A1 * | 8/2006 | Hakamata et al. ............. | 360/69 |
| 2008/0080131 | A1 * | 4/2008 | Hori et al. .................... | 361/685 |
| 2008/0201593 | A1 * | 8/2008 | Hori et al. .................... | 713/324 |
| 2009/0013215 | A1 * | 1/2009 | Kakihara et al. .............. | 714/43 |

FOREIGN PATENT DOCUMENTS

| | | |
|---|---|---|
| JP | 2000-293314 | 4/1999 |
| JP | 2001-339853 | 5/2000 |

* cited by examiner

*Primary Examiner*—Emerson C Puente
(74) *Attorney, Agent, or Firm*—Volpe and Koenig, P.C.

(57) ABSTRACT

The storage control device of the present invention switch-connects each of enclosures and individually stops the transmission of power to the enclosures that are not being accessed in order to reduce the power consumption amount. A plurality of additional enclosures are switch-connected via an inter-device switch to a base enclosure. Drives that have not been accessed for a predetermined period of time or more undergo spindown. If all the drives in the enclosure then assume the spindown state, the supply of power to each of the drives from the intra-enclosure power supply is stopped. In cases where all the drives in a certain enclosure have undergone spindown, the base enclosure turns OFF the switch in the power distribution circuit connected to this enclosure. As a result, the transmission of power to this enclosure is stopped. The fault diagnosis section detects a fault that has occurred with communications that employ the inter-device switch and specifies the point of the fault occurrence.

8 Claims, 32 Drawing Sheets

FIG. 15

VOLUME MANAGEMENT TABLE (T1)

| LU# (C11) | CAPACITY (C12) | RAID GROUP# (C13) | RAID LEVEL (C14) | DRIVE # LIST (C15) | LATEST ACCESS TIME (C16) |
|---|---|---|---|---|---|
| LU#0 | 200MB | RG01 | RAID5 | HDD01,02,03,04 | 2006/09/25 12:00:00 |
| ... | ... | ... | ... | ... | ... |

FIG. 16

POWER SAVING MANAGEMENT TABLE T2

| C21 | C22 | C23 | C24 | C25 | C26 | C27 | C28 | C29 |
|---|---|---|---|---|---|---|---|---|
| SW BOX# | ENCLOSURE # | HDD # | SPIN STATE | PDB-SW# | STATE | STATE OF POWER SUPPLY TO ENCLOSURE | CASCADE STATE | DIAGNOSIS RESULT |
| 0 | 0 | #0 ... #14 | ON ... ON | 01-0 11-0 | ON ON | ON (SW-BOX:ON) | — | — |
|   | 3 | #0 ... #14 | ON ... ON | 01-0 11-0 | ON ON | ON (SW-BOX:ON) | — | — |
| 1 | 4 | #0 ... #14 | OFF ... OFF | 01-0 11-0 | OFF OFF | OFF (SW-BOX:OFF) POWER SAVINGS | — | — |
|   | 7 | #0 ... #14 | OFF ... OFF | 01-0 11-0 | OFF OFF | OFF (SW-BOX:OFF) POWER SAVINGS | — | — |
| ⋮ | | | | | | | | |

FIG. 29

| SW-BOX#1 | GOOD | G11 | | |
|---|---|---|---|---|
| PART | STATUS | CONNECTION DESTINATION | POWER SAVINGS STATE | POWER SAVINGS STATE OF CONNECTION DESTINATION |
| EXP#0 | GOOD | | | OFF |
| EXP#0-P0 | LINK OK | CTL#0=P0 | | |
| EXP#0-P1 | LINK OK | SW-BOX#2-EXP#0-P0 | | |
| EXP#1 | GOOD | | | OFF |
| PS#0 | ON | PDB01-0 | | |

| RKA#1 | GOOD | G12 | | |
|---|---|---|---|---|
| PART | STATUS | CONNECTION DESTINATION | POWER SAVINGS STATE | POWER SAVINGS STATE OF CONNECTION DESTINATION |
| EXP#0 | GOOD | | | |
| EXP#1 | GOOD | | | |
| HDD#0 | SPINDOWN | | | |
| PS#0 | ON | PDB01-0 | | |

| PDB#1 | GOOD | G13 | | |
|---|---|---|---|---|
| PART | STATUS | CONNECTION DESTINATION | POWER SAVINGS STATE | POWER SAVINGS STATE OF CONNECTION DESTINATION |
| LAN | GOOD | DKC | | |
| #0 | ON | RKA#1-PS#0 | OFF | OFF |

US 7,836,349 B2

STORAGE CONTROL DEVICE AND ENCLOSURE-UNIT POWER CONTROL METHOD

CROSS-REFERENCE TO RELATED APPLICATIONS

This application relates to and claims priority from Japanese Patent Application No. 2007-176401 filed on Jul. 4, 2007, the entire disclosure of which is incorporated herein by reference.

BACKGROUND OF THE INVENTION

1. Field of the Invention

The present invention relates to a storage control device and enclosure-unit power control method.

2. Description of the Related Art

A storage control device comprises a storage section in which a multiplicity of hard disk drives are connected as an array and which provides a host computer ('host' hereinbelow) such as a server with a logical storage area (logical volume). In order to improve reliability, the storage control device provides the host with a RAID (Redundant Array of Independent Disks)-based redundant storage area.

The volume of data managed by enterprises and so forth is increasing on a daily basis. Therefore, a storage control device that is capable of suitably increasing the stored content in accordance with an increase in the data volume is preferable. Therefore, a storage control device that is capable of providing a storage area suited to the desires of the user through the connection of a plurality of additional enclosures that provide a storage area to a base enclosure that governs the control function has been proposed (Japanese Application Laid Open No. 2001-339853).

According to the prior art that appears in Japanese Application Laid Open No. 2001-339853, the start or stop of the supply of power to the base enclosure and the start or stop of the supply of power to each of the additional enclosures are linked. As a result, in cases where the storage control device is completely stopped, the supply of power to each of the additional enclosures can be completely stopped automatically by stopping the supply of power to the base enclosure.

According to further prior art that appears in Japanese Application Laid Open No. 2000-293314, the respective magnetic disk devices constituting a RAID group are moved to power savings mode.

According to the prior art that appears in Japanese Application Laid Open No. 2001-339853, the power supply operation for the base enclosure and the power supply operation for the respective additional enclosures are linked and the result is poor from the perspective of reducing the power consumption amount of the storage control device.

In contrast, in the prior art that appears in Japanese Application Laid Open No. 2000-293314, the power consumption amount of the storage control device can be reduced in order to shift a magnetic disk device that has not been accessed for a fixed time to a power savings mode.

However, the prior art that appears in Japanese Application Laid Open No. 2000-293314 is lacking in terms of the curtailment of the power consumption amount of the respective magnetic disk devices constituting the RAID group and there is a further margin for improvement. That is, even in cases where the respective magnetic disk devices are shifted to power savings mode, power is still supplied to the control circuit section, cooling fan, and power source circuit in the enclosure, which continue to operate. Hence, there is a margin for improvement for the power consumption amount of the respective parts other than the magnetic disk device.

SUMMARY OF THE INVENTION

The present invention was conceived in view of the above problems and an object thereof is to provide a storage control device and enclosure-unit power control method that are constituted so as to be able to supply and stop power in enclosure units by switch-connecting the first enclosure and each of the second enclosures and to be able to detect and diagnose faults relating to communication between the first enclosure and each of the second enclosures. A further object of the present invention is to provide a storage control device and enclosure-unit power control method that are constituted so as to be able to supply and stop power in enclosure units by switch-connecting the first enclosure and each of the second enclosures and to be able to further reduce the power consumption amount by not supplying power at initial startup time to the enclosure which is set in a power conservation state or to an inter-enclosure connecting switch. Further objects of the present invention will become evident from the subsequent embodiments.

In order to achieve the above problem, a storage control device having a plurality of enclosures according to a first aspect of the present invention comprises a first enclosure for inputting and outputting data to and from a storage device in accordance with an access request from a higher-level device; at least one or more second enclosures each comprising the storage device and operating in accordance with an instruction from the first enclosure; an inter-enclosure connection switch that switch-connects the first enclosure and each of the second enclosures; and a power supply circuit section that supplies power individually to the first enclosure, each of the second enclosures, and the inter-enclosure connection switch respectively, wherein the first enclosure comprises an upper communication section for communicating with the higher-level device; a lower communication section for communicating with each of the second enclosures via the inter-enclosure connection switch; a constitution information management section that manages information relating to the constitution of the first enclosure and each of the second enclosures; a power control section that uses the constitution information to control the start or stoppage of the power to each of the second enclosures or the inter-enclosure connection switch; and a fault diagnosis section that detects and diagnoses a fault relating to communication between the lower communication section and each of the second enclosures.

According to an embodiment of the present invention, the constitution information includes at least the spin states of each of the storage devices and the power savings states of each of the second enclosures and the inter-enclosure connection switch; and the power control section references the constitution information upon initial startup when power is to be supplied to all of the second enclosures and the inter-enclosure connection switch, supplies power only to each of the second enclosures and the inter-enclosure connection switch which have not been set to the power savings state, and does not supply power to each of the second enclosures and the inter-enclosure connection switch which have been set to the power savings state.

According to an embodiment of the present invention, the constitution information includes at least the states indicating the constitution of the connection from the first enclosure to the storage devices in each of the second enclosures via the inter-enclosure switch; the fault diagnosis section comprises:

a fault detection section that detects a communication-related fault that is produced in any diagnosis target device of the inter-enclosure connection switch and each of the second enclosures; a specifying section that specifies the point where the fault has occurred by using the constitution information; and a reporting section that issues a report relating to the specified fault.

According to an embodiment of the present invention, (1) a communication path extending from the first enclosure to each of the storage devices is made redundant by a primary path and secondary path; (2) the inter-enclosure connection switch and each of the second enclosures each comprise (2-1) a power source circuit to which power is supplied from the power supply circuit; (2-2) a primary control substrate which is driven by the power output by the power source circuit and which is connected to the primary path; (2-3) a secondary control substrate which is driven by the power output by the power source circuit and is connected to the secondary path; and (2-4) a control line which is provided between the primary control substrate and the secondary control substrate and which is for mutually connecting the primary and secondary paths; (3) in cases where a fault is detected by the fault detection section, the specifying section (3-1) attempts access via the secondary path to the diagnosis target device in which the fault has been detected; (3-2) investigates the power output state of the power supply circuit section connected to the power source circuit in the diagnosis target device in cases where the specifying section can access the diagnosis target device via the secondary path; (3-2-1) judges that a fault lies with the power supply circuit in cases where power is not being output normally from the power supply circuit section; (3-2-2) judges that a fault lies with the power source circuit in the diagnosis target device in cases where power is being output normally from the power supply circuit; (3-3) investigates whether the primary path can be used via the control line from the secondary path in cases where the specifying section accesses the diagnosis target device via the secondary path; (3-3-1) examines whether the voltage in the diagnosis target device is normal in cases where the primary path cannot be used even via the control line, judges that a fault lies with the communication control circuit in the diagnosis target device in cases where the voltage is normal; judges that a fault lies with the power source circuit in the diagnosis target device or with a power supply path from the power source circuit to the communication control circuit in cases where the voltage is not normal; and (3-3-2) judges that the fault is a link fault in cases where the primary path can be used via the control line.

According to an embodiment of the present invention, (4) in cases where judgment is made that the fault is the link fault, the specifying section (4-1) performs a first internal loop-back test by using the primary path and, in cases where a response is obtained by the first internal loop-back test, judges that a fault lies with the path between the connection destination device connected to the diagnosis target device and the diagnosis target device; (4-2) performs a second loop-back test by using the secondary path in cases where a response is not obtained as a result of the first internal loop-back test, judges that a fault lies with the communication control circuit in the diagnosis target device in cases where a response is not obtained as a result of the second internal loop-back test, and judges that a fault has occurred in the path between the diagnosis target device and the first enclosure in cases where a response is obtained as a result of the second internal loop-back test.

According to an embodiment of the present invention, the first enclosure is connected to a plurality of the second enclosures via a cascade-connected plurality of the inter-enclosure connection switches.

According to an embodiment of the present invention, each of the second enclosures can be categorized into an upper second enclosure and a lower second enclosure; the upper second enclosure has a star connection with the first enclosure via the inter-enclosure connection switch; and the lower second enclosure has a daisy-chain connection with the upper second enclosure.

According to an embodiment of the present invention, the power control section (1) stops power supply to second enclosures for which all the storage devices in those enclosures have shifted to a power savings mode among each of the second enclosures, and (2) re-opens the power supply to the second enclosures for which the power supply has stopped in response to an access request that is issued by the higher-level device.

A power control method that controls power supply of a storage control device in enclosure units according to another aspect of the present invention, (1) the storage control device comprising a first enclosure for inputting and outputting data to and from a storage device in accordance with an access request from a higher-level device; at least one or more second enclosures each comprising the storage device and operating in accordance with an instruction from the first enclosure; an inter-enclosure connection switch that switch-connects the first enclosure and each of the second enclosures; and a power supply circuit section that supplies power individually to the first enclosure, each of the second enclosures, and the inter-enclosure connection switch respectively; (2) the first enclosure comprising an upper communication section for communicating with the higher-level device; a lower communication section for communicating with each of the second enclosures via the inter-enclosure connection switch; a constitution information management section that manages information relating to the constitution of the first enclosure and each of the second enclosures; a power control section that uses the constitution information to control a start or stoppage of the power to each of the second enclosures or the inter-enclosure connection switch; and a fault diagnosis section that detects and diagnoses a fault relating to communication between the lower communication section and each of the second enclosures; (3) the constitution information including at least spin states of each of the storage devices and power savings states of each of the second enclosures and the inter-enclosure connection switch and states indicating constitution of the connection from the first enclosure to the storage devices in each of the second enclosures via the inter-enclosure switch; and (4) the fault diagnosis section executing the steps of: detecting a communication-related fault that is produced in any diagnosis target device of the inter-enclosure connection switch and each of the second enclosures; specifying a point where the fault has occurred by using the constitution information; and issuing a report relating to the specified fault.

BRIEF DESCRIPTION OF THE DRAWINGS

FIG. 15 is an explanatory diagram that shows a table for managing volumes;

FIG. 16 is an explanatory diagram that shows a table for managing power supply states;

FIG. 29 is an example of a screen showing the states of the respective parts of the storage control device;

DESCRIPTION OF THE SPECIFIC EMBODIMENTS

Figure 1:
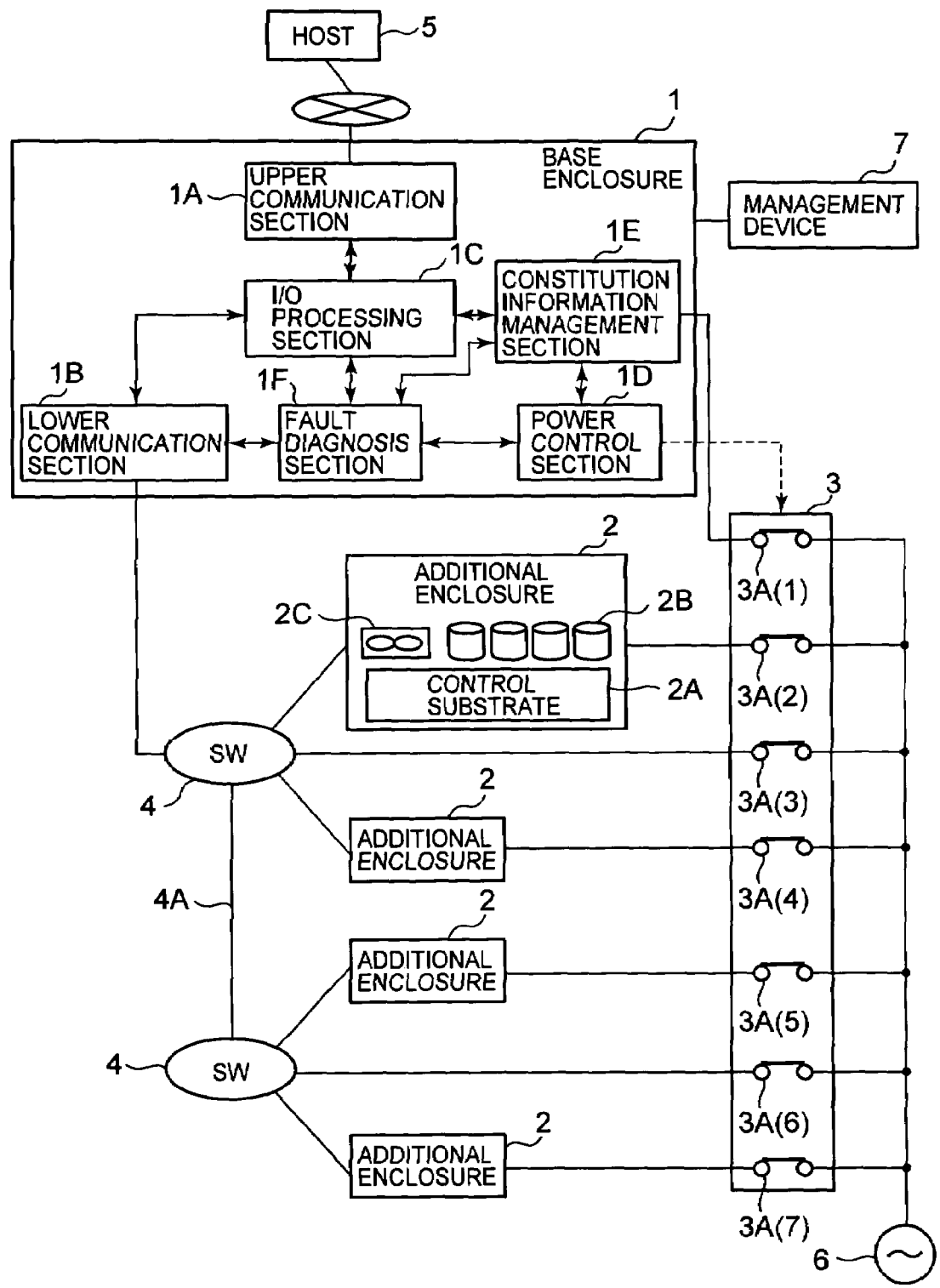
FIG. 1 is an explanatory diagram that provides an overview of an embodiment of the present invention.

Embodiments of the present invention will be described hereinbelow based on the drawings. FIG. 1 is an explanatory diagram that provides an overview of the whole storage control device according to this embodiment. This embodiment is constituted such that, as described hereinbelow, the base enclosure 1, which is the 'first enclosure' and the additional enclosures 2, which are the 'second enclosures' are switch-connected via inter-device switches 4, which are the inter-enclosure connecting switches' and such that the supply of power to all of the additional enclosures 2 can also be individually controlled in enclosure units. In addition, this embodiment is constituted such that a fault that occurs on a communication path between the base enclosure 1 and the respective additional enclosures 2 can be detected and the point where the fault occurred can be specified.

The storage control device according to this embodiment is constituted comprising a base enclosure 1 and a plurality of additional enclosures 2. The base enclosure 1 and additional enclosures 2 are switch-connected via an inter-device switch (sometimes abbreviated as 'switch' hereinbelow) 4. In addition, the switches 4 can be cascade-connected via a communication path 4A and, accordingly, a multiplicity of additional enclosures 2 can be connected to the base enclosure 1.

The transmission of signals and data between the base enclosure 1 and each of the additional enclosures 2 is performed via inter-device switches 4. That is, respective additional enclosures 2 are star-connected with the base enclosure 1 at the center thereof. The base enclosure 1 is an enclosure that governs control of the whole storage control device and which is connected to a host 5, which is a higher-level device, and the respective additional enclosures 2. The base enclosure 1 accesses disk drives 2B in the additional enclosures 2 in accordance with commands that are issued by the host 5 and reads and writes data thereto/therefrom.

The base enclosure 1 comprises, for example, a higher level communication section 1A, a lower level communication section 1B, an I/O processing section 1C, a power control section 1D, a constitution information management section 1E, and a fault diagnosis section 1F. As will also be clear from the subsequent embodiments, the base enclosure 1 can also comprise a disk drive.

The higher level communication section 1A is for performing communications with the host 5. The lower level communication section 1B is for performing communications with the respective additional enclosures 2 via the switches 4. The host 5 and higher level communication section 1A perform communications in accordance with a protocol such as the Fibre Channel protocol, iSCSI (internet Small Computer System Interface) and IP (Internet Protocol), for example. The lower level communication section 1B and the respective additional enclosures 2 perform communications in accordance with the Fibre Channel protocol, for example. The above are examples and the present invention is not limited by a type of protocol.

The I/O processing section 1C writes data or reads data by accessing the disk drives 2B in the respective additional enclosures 2 based on commands issued by the host 5.

The power supply section 1D controls the start and stop of power for the respective additional enclosures 2, which is one control function of the base enclosure 1. The power control section 1D is able to execute power conservation modes of a plurality of types with respective timing, for example.

In a mode that implements power conservation in drive units, for example, power conservation is implemented for each drive by stopping the transmission of power to the motor of those disk drives 2B which have not been accessed for a fixed time or stopping part of the electronic circuit.

In a mode that stops the transmission of power to all the drives, by stopping the transmission of power to all of the disk drives 2B provided in the same enclosure, power conservation is implemented for all the disk drives in the enclosure. In this power conservation mode, the transmission of power to a device that can be stopped in accordance with the stoppage of all of the disk drives 2B, such as a cooling fan 2C, for example, can also stopped.

In a mode that stops the transmission of power to the whole enclosure, the supply of power from an external power source 6 to the additional enclosures 2 is completely stopped by opening switch 3A of the power supply circuit section 3. In this power conservation mode, the respective functions of the additional enclosures 2 are stopped to achieve the highest power conservation effect.

The power control section 1D can also be equipped with a self-diagnosis mode. In the self-diagnosis mode, it is diagnosed whether, for additional enclosures 2 for which the transmission of power to the whole enclosure has been stopped, these additional enclosures 2 are operating normally by transmitting power at regular or irregular intervals.

The constitution information management section 1E stores and manages information relating to the system constitution of the storage control device. Information relating to the system constitution can include, for example, information relating to the disposition of the disk drives 2B, information relating to the constitution of the RAID group and the logical volumes, information relating to the constitution of the connection between the additional enclosures 2 and the power supply circuit section 3, and information relating to the constitution of the connection between the base enclosure 1 and respective additional enclosures 2. In this embodiment, the base enclosure 1 integrally manages all the constitution information relating to the storage control device. The power supply control circuit 1D stops the transmission of power to the intended additional enclosure 2 by referencing system constitution information.

The fault diagnosis section 1F detects faults that have arisen relating to communication between the lower communication section 1B and the respective additional enclosures 2, specifies the point where the fault occurred and reports same to a management device 7. The method for detecting the fault and the method for specifying the fault occurrence point will be described in detail in the following embodiments.

The power supply circuit section 3 is a circuit for distributing AC power from the external power source 6 to each of the enclosures 1 and 2, for example. Although the distribution of the power to the base enclosure 1 is omitted here, the external power source 6 and base enclosure 1 are connected via the power supply circuit section 3 as can be seen from subsequent embodiments.

The power supply circuit section 3 is a circuit for supplying power to the respective enclosures 1 and 2 and the respective switches 4. The power supply circuit section 3 comprises switch 3A that connects the respective additional enclosures 2 and external power source 6. Hence, in cases where the supply of power to the intended additional enclosure 2 or switch 4 is stopped, switch 3A, which is connected to the additional enclosure 2 or switch 4, is opened. As a result, the power supply circuit for the supply of power to the intended additional enclosure 2 or switch 4 is disconnected.

The power supply circuit section 3 can be constituted as a device that is separate from the respective enclosures 1 and 2 but the constitution is not limited to a separate power supply circuit section 3; same can also be provided in the respective enclosures 1 and 2. In other words, for example, the constitution may also be such that switch 3A is provided in the respective additional enclosures 2.

The respective additional enclosures 2 are constituted comprising, for example, a control substrate 2A, a plurality of disk drives 2B, an intra-enclosure power source section (See subsequent embodiments), and a cooling fan 2C. The control substrate 2A inputs and outputs data to and from the disk drives 2B on the basis of instructions from the base enclosure 1.

The disk drive 2B corresponds to a storage device. Although the disk drive 2B is called a disk drive for the sake of convenience here, same may also be a storage device that uses a medium other than a disk. Possible disk drives 2B include, for example, a hard disk drive, a semiconductor memory device, a flash memory device, an optical disk drive, a magneto-optical disk drive, a magnetic tape device, a holographic memory device, and so forth.

The intra-enclosure power supply section converts AC power or DC power that is input from the external power source 6 via the power supply circuit section 3 into DC power of a predetermined voltage and supplies same to the control substrate 2A, respective disk drives 2B, and cooling fan 2C. The intra-enclosure power source section can be constituted to stop the transmission of power to each of the disk drives 2B in accordance with an instruction from the control substrate 2A.

The cooling fan 2C performs cooling by guiding a cool air stream inside the additional enclosures 2. The cooling fan 2C is an example of a load other than the disk drives 2B that exist in the additional enclosures 2. The cooling fan 2C operates in accordance with signals from the control substrate 2A. In other words, the control substrate 2A is able to control operation start and operation stop of the cooling fan 2C, as well as the speed thereof, for example. Although cooling fan 2C is cited as the cooling mechanism, the cooling fan 2C may be constituted such that the additional enclosures 2 comprise a water cooling mechanism. In the case of a water cooling mechanism, the power consumption amount of the additional enclosures 2 is curtailed by controlling the operation of a cooling water circulation pump or heat exchanger, for example.

As described earlier, in this embodiment, the respective additional enclosures 2 are disposed in a star shape with the base enclosure 1 at the center thereof. Hence, after communicating with the base enclosure 1, the respective additional enclosures 2 are separate from one another and do not affect the other additional enclosures 2. In other words, the base enclosure 1 is able to communicate directly with the intended additional enclosure 2 and, even in cases where the supply of power to a certain additional enclosure 2 is disconnected, the other additional enclosures 2 are able to communicate with the base enclosure 1. Hence, the base enclosure is able to freely stop the supply of power to the additional enclosures 2 for which all the disk drives 2B have shifted to a power conservation mode.

Further, the disk drives 2B can be categorized into a plurality of groups according to performance and reliability and so forth, namely, high-performance disk drives such as FC (Fibre Channel) disks and low-performance disk drives such as SATA (Serial AT Attachment) disks, for example. The respective additional enclosures 2 are each able to contain disk drives 2B of the same type. That is, a certain additional enclosure 2 contains only high-performance disk drives 2B while the other additional enclosures 2 contain only low-performance disk drives 2B.

Further, for example, high-performance disk drives 2B store data that are used frequency by the host 5 and low-performance disk drives 2B store data that are infrequently used by the host 5 (backup data and archive data and so forth, for example). As a result, the time taken to supply power to the additional enclosures 2 containing low-performance disk drives 2B can be shortened and the power consumption amount can be reduced. The storage control device of this embodiment will be described in detail hereinbelow.

First Embodiment

Figure 2:
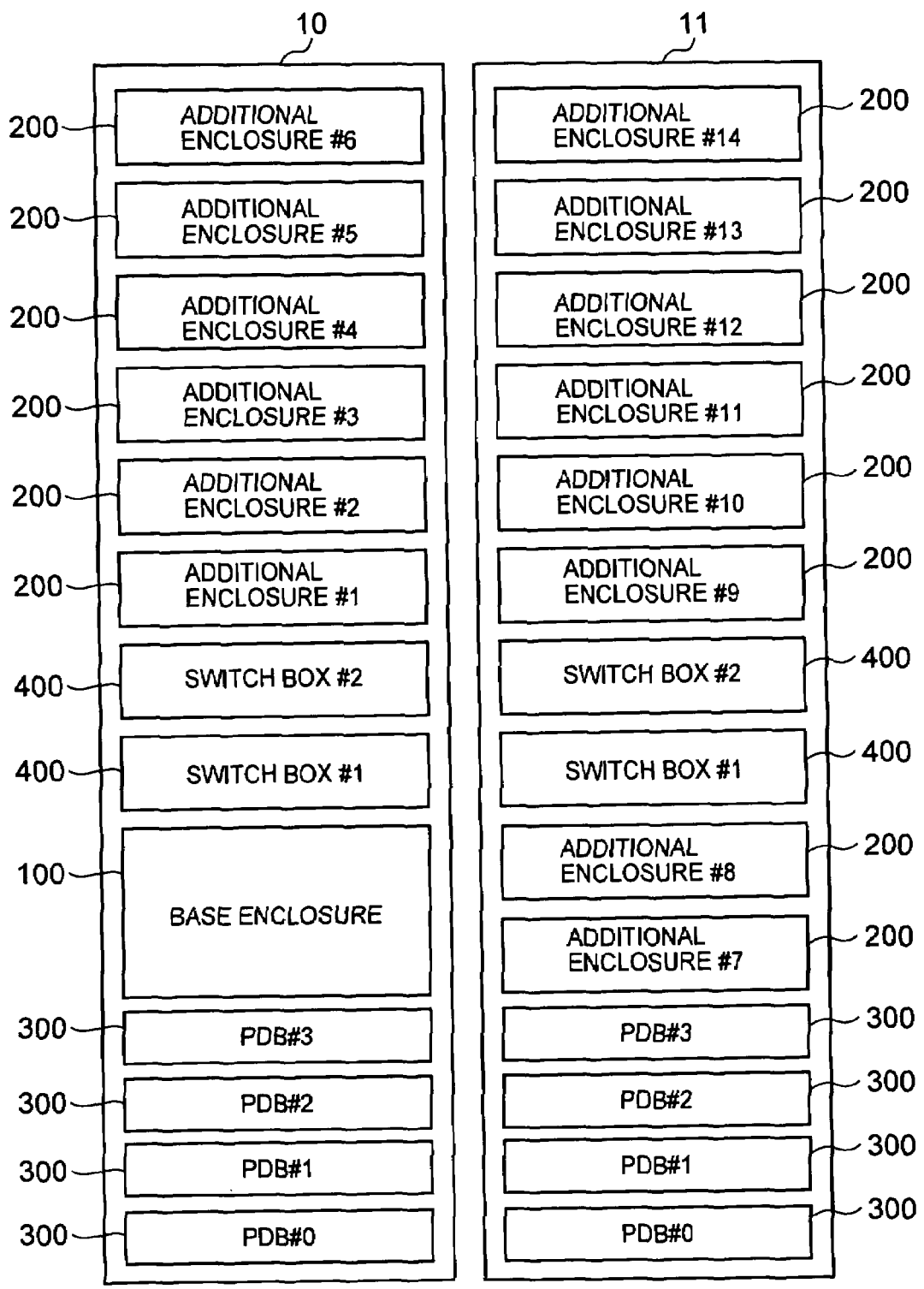
FIG. 2 is a front view of a storage control device.

FIG. 2 is an explanatory diagram that schematically shows a front view of the storage control device. The storage control device is constituted by using cables to connect a base rack 10 and one or a plurality of additional racks 11, for example. The base rack 10 comprises, for example, base enclosure 100 and a plurality of additional enclosures 200, and a plurality of switch boxes 400. The base rack 10 has the smallest constitution in the storage control device and the functions of the storage control device can be implemented by the base rack 10 alone.

The additional rack 11 comprises, for example, a plurality of additional enclosures 200 and a plurality of switch boxes 400. In cases where the storage capacity of the base rack 10 is no longer sufficient, the storage capacity can be increased by connecting the additional rack 11 to the base rack 10.

Figure 3:
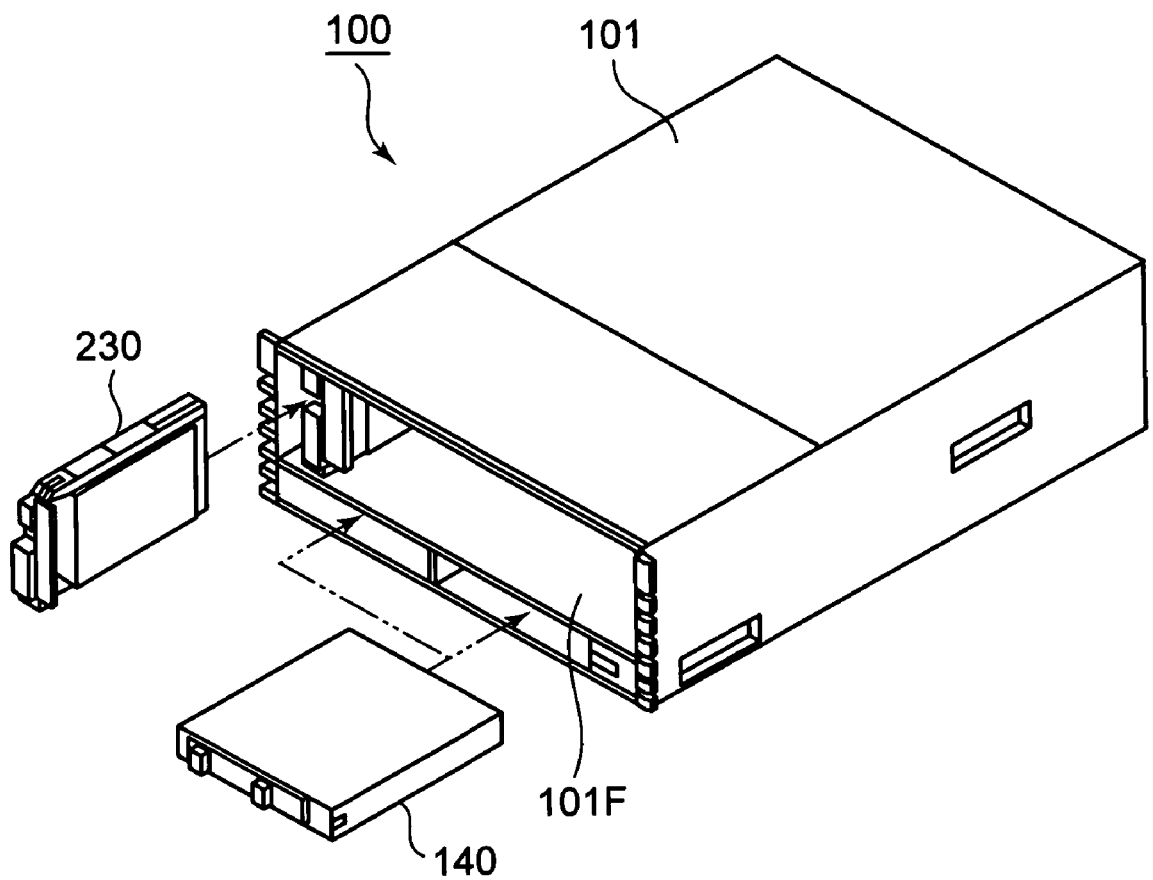
FIG. 3 is a perspective view in which the base enclosure is viewed from the front.

FIG. 3 is a perspective view of the base enclosure 100 from the front side. The casing 101 of the base enclosure 100 is provided at the front side 101F thereof, with a plurality of batteries 140 and a plurality of disk drives 230. The base enclosure 100 may be constituted comprising the disk drives 230 or may be constituted not comprising the disk drives 230. In cases where the disk drives 230 are not provided, a predetermined point of the front side 101F either has another constituent part such as a battery mounted therein or is covered by a decorative plate or the like.

Figure 4:
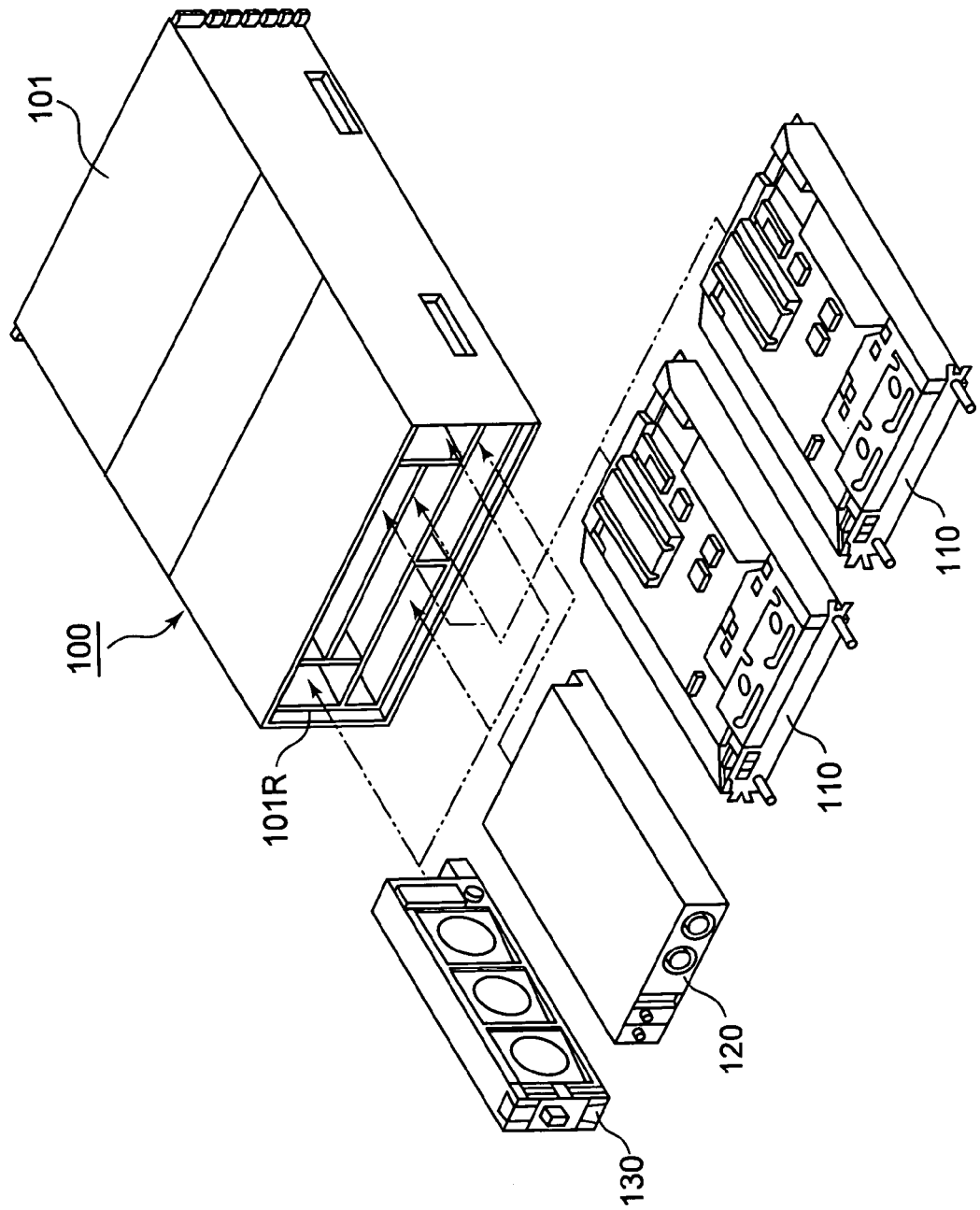
FIG. 4 is a perspective view in which the base enclosure is viewed from the rear.

FIG. 4 is a perspective view of the base enclosure 100 from the rear side. The rear side 101R of the casing 101 has, for example, a plurality of controllers 110, a plurality of intra-enclosure power source sections 120, and a plurality of cooling fans 130 attached thereto.

The cooling fans 130 are constituted as a fan assembly in which a plurality of fans are integrated and are disposed on both the left and right sides of the casing 101. The controllers 110 are disposed vertically at the center of the casing 101. The intra-enclosure power source sections 120 are disposed in parallel on the left and right in the lower part of the casing 101. The constitutions of the base enclosure 100 and additional enclosures 200 are not limited to the constitutions shown in the drawings, which is also true for the subsequent description of the additional enclosure 200.

Figure 5:
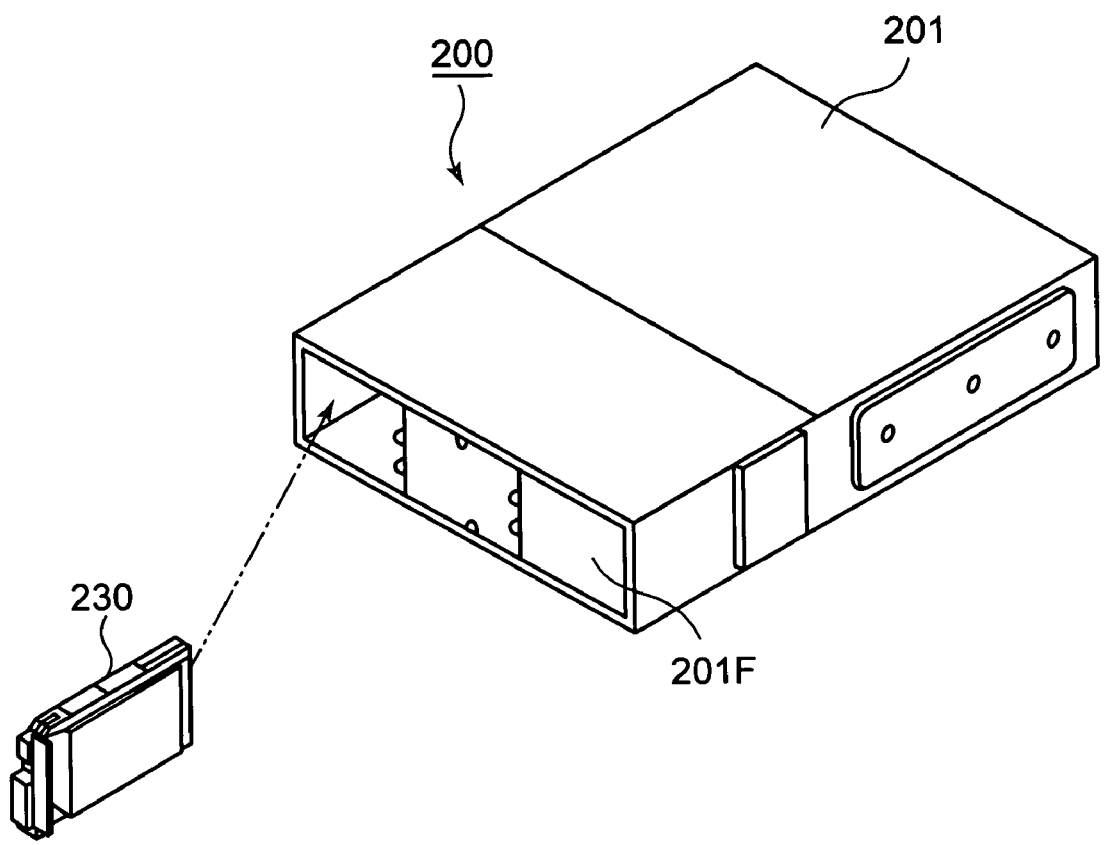
FIG. 5 is a perspective view in which an additional enclosure is viewed from the front.

FIG. 5 is a perspective view of an additional enclosure 200 viewed from the front side. The front side 201F of the casing 201 of the additional enclosure 200 can have a plurality of disk drives 230 attached thereto. In this embodiment, a case where a total of fifteen disk drives 230 numbered #0 to #14 are attached will be described by way of example. The number of disk drives mounted per enclosure is not limited to fifteen. The space where disk drives 230 are not attached is covered by a decorative plate or the like to prevent the invasion of dust from the outside into the casing 201.

Figure 6:
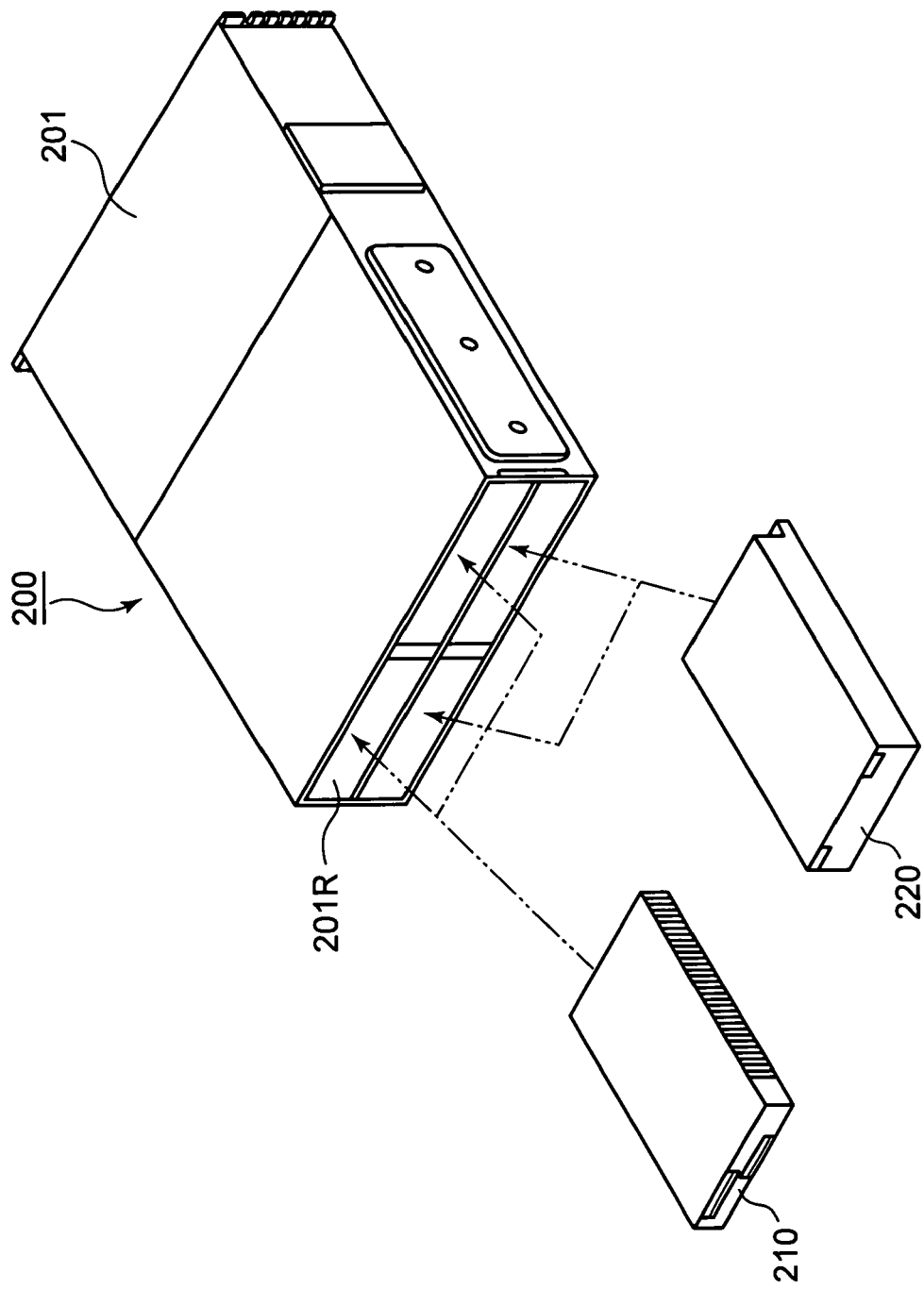
FIG. 6 is a perspective view in which an additional enclosure is viewed from the rear.
Figure 10:
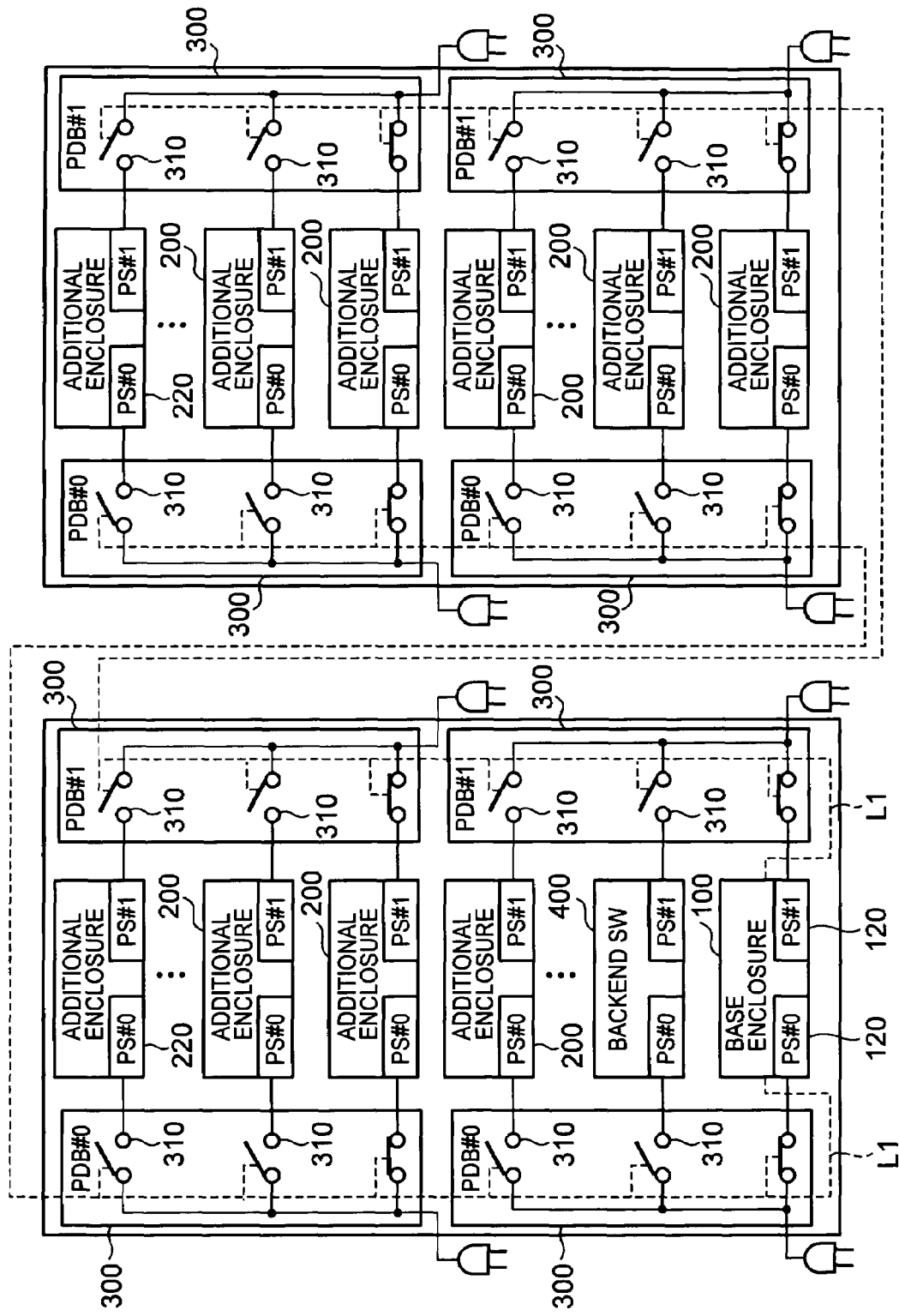
FIG. 10 is an explanatory diagram that shows the power supply structure of the storage control device.

FIG. 6 is a perspective view of an additional enclosure 200 from the rear side. The rear side 201R of the casing 201 has a plurality of control substrates 210 and a plurality of intra-enclosure power source sections 220 attached thereto. Although the cooling fan is mounted in the intra-enclosure power source section 220 in the constitution of FIG. 6, as shown in FIG. 10, a cooling fan 202 can be provided in the additional enclosure 200. That is, a cooling fan and power source section may also be separate constituent parts.

Figure 7:
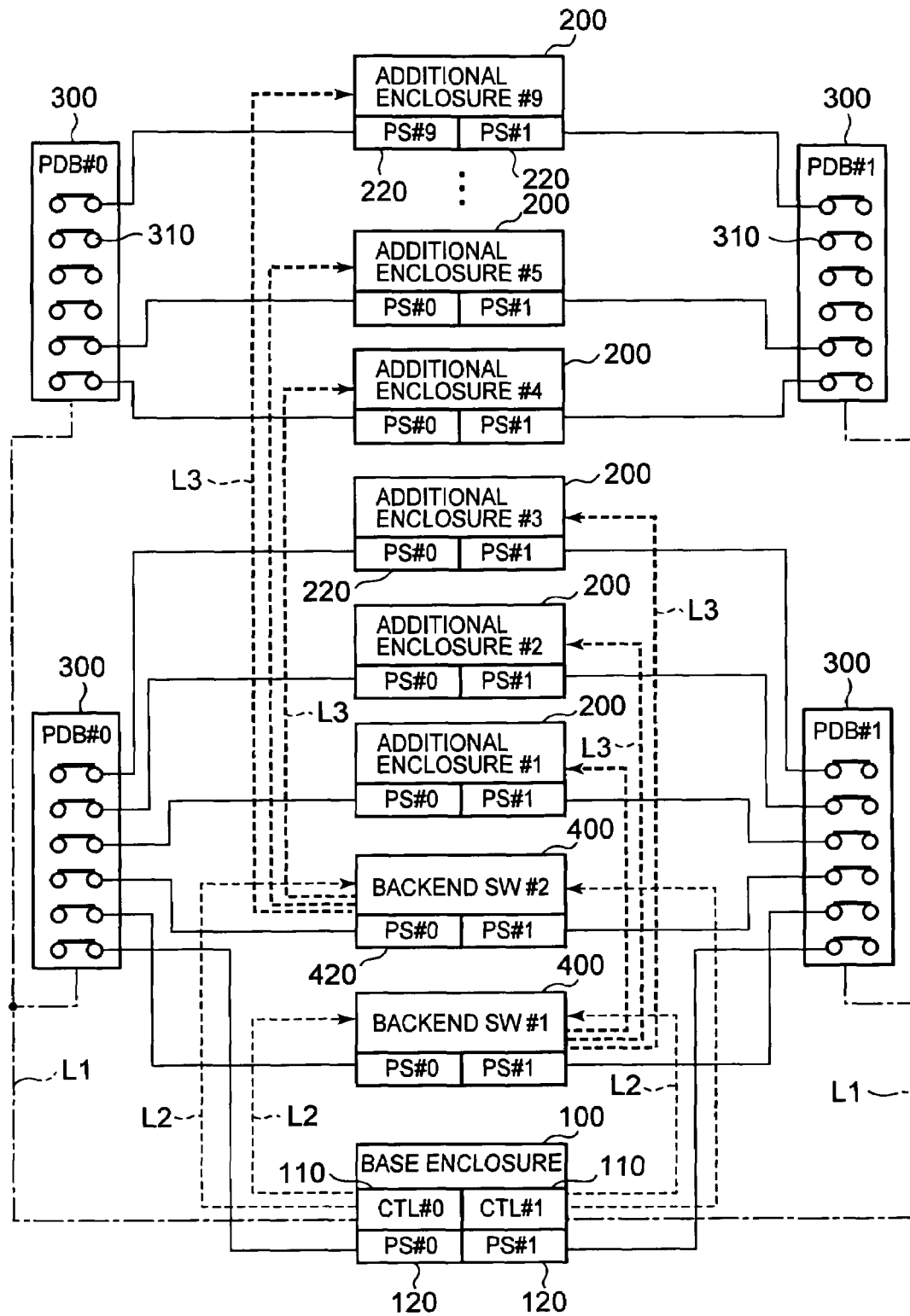
FIG. 7 is an explanatory diagram that schematically shows the connection configuration of the storage control device.

FIG. 7 is an explanatory diagram that schematically shows the constitution of the storage control device. The respective racks 10 and 11 are provided with a power distribution circuit section 300 for supplying power from the outside to the respective enclosures 100 and 200. In the following description, the power distribution circuit section 300 is called a PDB (Power Distribution Box).

The storage control device can comprise a plurality of power supply systems. One system is a primary system that is indicated by 'PDB#0' on the left side of FIG. 7 while the other system is a secondary system which is indicated by 'PDB#1' on the right side of FIG. 7. That is, the power supply structure of the storage control device is made redundant by the primary and secondary systems.

The respective PDB 300 are capable of distributing power from the outside to enclosures of a predetermined number such as four, six, or the like, for example. Therefore, in cases where a multiplicity of enclosures are attached within one rack, a plurality of PDB 300 are required for each of the plurality of power supply systems. Further, the constitution may instead be such that a single PDB that is capable of distributing power from the outside to the maximum number of enclosures that can be mounted in racks is used for each of the respective power supply systems.

Each of the PDB 300 comprises a predetermined number of switches 310. The respective switches 310 are connected to power source sections in corresponding enclosures. The AC/DC power source sections are shown abbreviated to 'PS' in FIG. 7.

The respective intra-enclosure power source sections 120 of the base enclosure 100 are each connected to the switches 310 of the PDB 300 of the other systems. Likewise, the respective intra-enclosure power source sections 220 of the respective additional enclosures 200 are each connected to the switches 310 of the PDB 300 of the other systems. Hence, even when a fault occurs on either PDB 300, power can still be supplied to the respective enclosures 100 and 200 from the other PDB 300.

The controller 110 of the base enclosure 100 is connected to each of the PDB 300 via a signal line L1 as indicated by the dot-chain line in FIG. 7. The controller 110 can individually control the opening and closing of the respective switches 310. In cases where the supply of power to the intended additional enclosures 200 is completely stopped, the controller 110 shuts of the power supply route between the external power source and intra-enclosure power source section 220 by opening each of the switches 310 of the respective systems connected to the additional enclosures 200.

Further, the respective controllers 110 and respective PDB 300 may be connected by way of a wired connection or a wireless connection. When the connection is a wireless connection, a circuit for opening and closing the respective switches 310 in accordance with a wireless signal from the controller 110 may be provided in the PDB 300. In addition, the constitution may also be such that the respective controllers 110 and respective PDB 300 are connected via a switch box 400.

The switch box 400 is a device for switch-connecting the base enclosure 100 and respective additional enclosures 200 and corresponds to an 'intra-enclosure connecting switch'. Each switch box 400 is connected to a predetermined additional enclosure 200 via a signal line L3 as indicated by the dotted lines in FIG. 7.

The respective switch boxes 400 and the controllers 110 of the base enclosure 100 are connected via a signal line L2. The respective controllers 110 communicate with the desired additional enclosure 200 via switch boxes 400 that are connected to the desired additional enclosure 200. Further, as described in conjunction with FIG. 8, the plurality of switch boxes 400 can also be cascade-connected.

Figure 8:
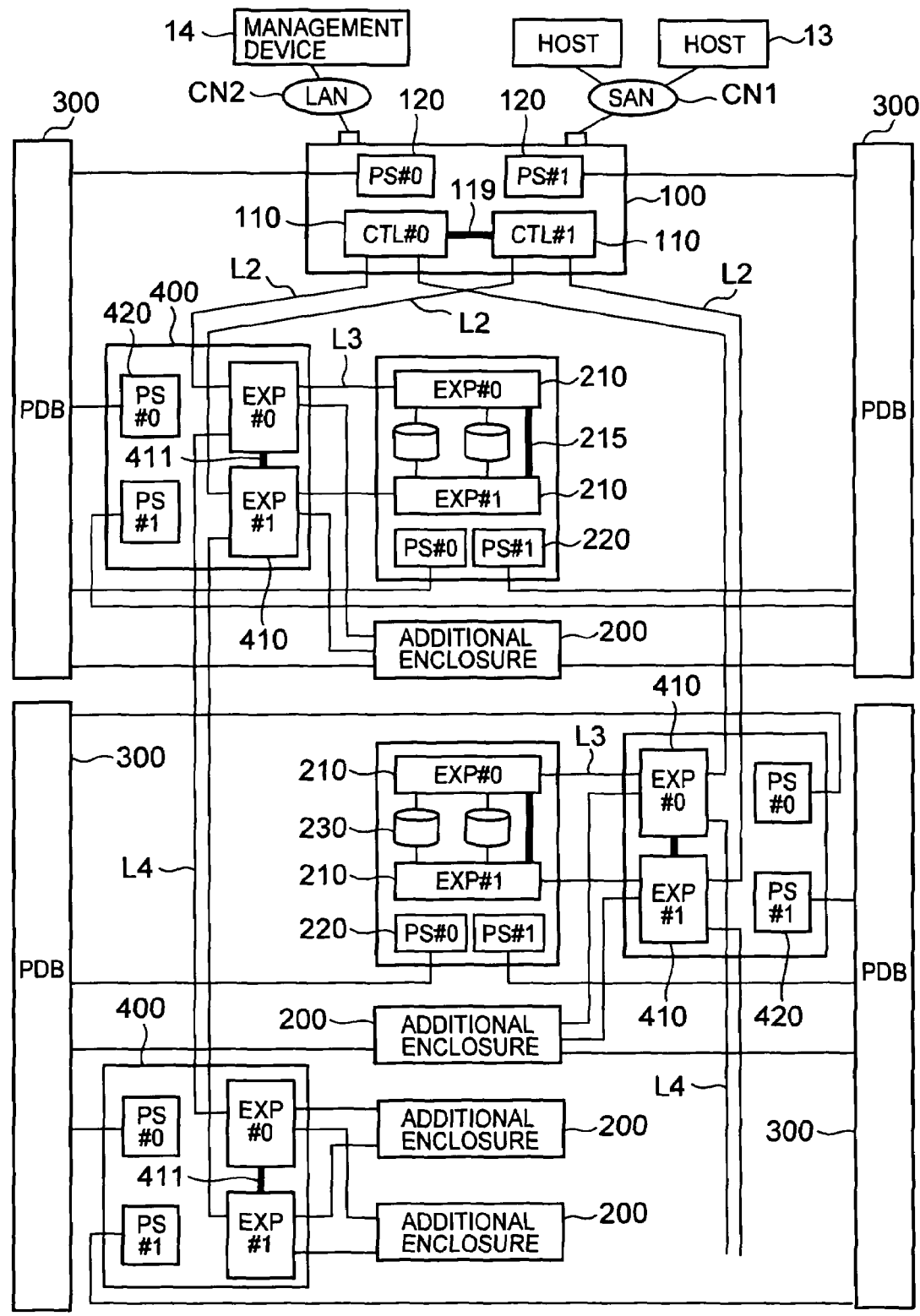
FIG. 8 is a block diagram of the storage control device.

FIG. 8 is an explanatory diagram showing the constitution of the connection between the switch boxes 400 and each of the enclosures 100 and 200. The detailed constitution of the base enclosure 100, additional enclosure 200, and PDB 300 will be described subsequently in conjunction with different drawings.

As shown at the top of FIG. 8, the base enclosure 100 is connected to one or a plurality of hosts 13 via a communication network CN1 such as a SAN, for example. In addition, the base enclosure 100 is connected to at least one management device 14 via a communication network CN2 such as a LAN. The base enclosure 100 accesses the disk drive 230 on the basis of an access request that is issued by a host 13 and sends back the processing result to the host 13. The management device 14 collects information related to various states of the storage control device (the usage ratio of the cache memory or volume, processor usage ratio, I/O volume, internal voltage value, and internal temperature and so forth, for example), displays this information on a terminal display, and notifies the user. In addition, the constitution of the storage control device can also be changed in accordance with an instruction from the management device 14.

The base enclosure 100 comprises two controllers (sometimes abbreviated as 'CTL' in FIG. 8) 110 and two intra-enclosure power source sections 120. The additional enclosures 200 comprise two control substrates (sometimes abbreviated as 'EXP' in FIG. 8) 210 and two intra-enclosure power source sections 220, and a plurality of disk drives 230 (fifteen, for example).

The switch boxes 400 comprise two communication control circuits (sometimes abbreviated as 'EXP' in FIG. 8) 410 and two intra-enclosure power source sections 420. The communication control circuits 410 are connected to controllers 110 in the base enclosure 100 via signal lines L2 and connected to the control substrate 210 in the additional enclosure 200 via the signal lines L3.

The path from the base enclosure 100 to the disk drives 230 is made redundant by the two paths of the primary system (#0) and secondary system (#1). In other words, the primary controller 110 (#0) is connected to the primary communication control circuit 410 (#0) via signal line L2 and the communication control circuit 410 (#0) is connected to the primary control substrate 210 (#0) via signal line L3. The same is true for the secondary system.

In addition, the respective communication control circuits 410 in the switch box 400 are mutually connected via a control wire 411. As a result, the primary communication control circuit 410 (#0) is able to access the secondary control substrate 210 (#1) via the control line 411 and, likewise, the secondary communication control circuit 410 (#1) is able to access the primary control substrate 210 (#0) via the control line 411.

The constitution that connects the primary substrate and secondary substrate by way of a control line is the same as that for the base enclosure 100 and the respective additional enclosures 200. The respective controllers 110 (#0, #1) in the base enclosure 100 are mutually connected via a control line 119. The respective control substrates 210 (#0, #1) in the additional enclosures 200 are mutually connected via a control line 215. Thus, the storage control device of this embodiment multiplexes communication systems so that access to the disk drives 230 is still possible even when a fault occurs in either the primary or secondary system.

As shown on the left side of FIG. 8, a plurality of switch boxes 400 can also be cascade-connected via signal lines L4. The communication control circuit 410 (#0) in one switch box 400 is cascade-connected to the communication control circuit 410 (#0) in another switch box 400 via signal line L4. Likewise, the communication control circuit 410 (#1) in one switch box 400 is cascade-connected to the communication control circuit 410 (#1) in the other switch box 400 via another signal line L4. By cascade-connecting a plurality of switch boxes 400, data can be input and output to and from a multiplicity of disk drives 230.

When the power supply system is considered, two intra-enclosure power supply sections 120, 220, and 420 that are provided in the respective devices 100, 200, and 400 are connected to the PDB 300 of the corresponding systems. In other words, the intra-enclosure power source sections of the primary system have power supplied thereto from the PDB 300 of the primary system while power is supplied to the intra-enclosure power supply sections of the secondary system from the PDB 300 of the secondary system.

Figure 9:
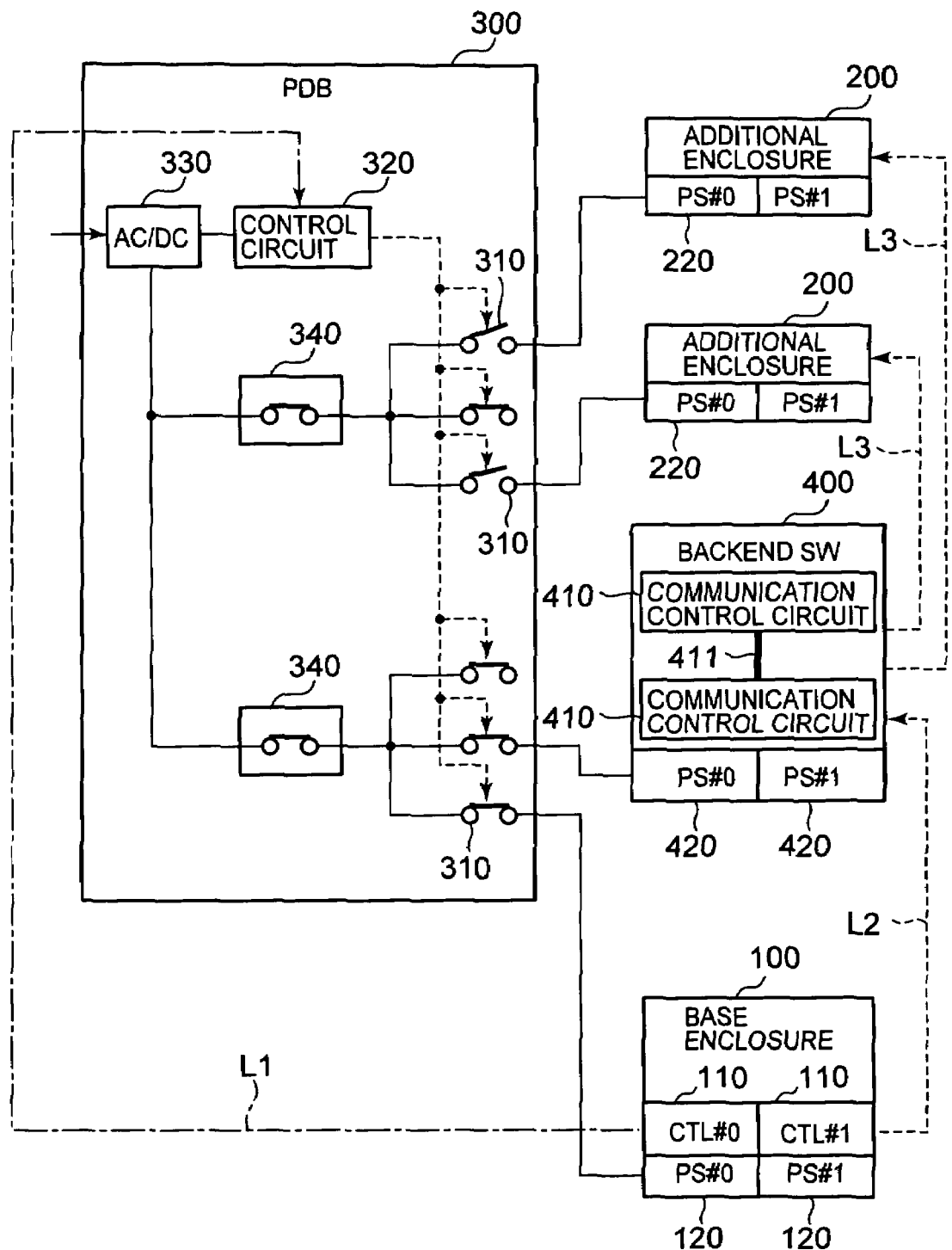
FIG. 9 is a circuit diagram that shows part of the storage control device removed.

FIG. 9 is a circuit diagram that focuses on the constitution of the PDB 300. The PDB 300 is constituted comprising, for example, a plurality of switches 310, a control circuit 320, an AC/DC power supply section 330, and a plurality of breakers 340. The AC power that is input from the outside is converted to DC power by the AC/DC power supply section 330. The converted DC power supply is supplied to the intra-enclosure power supply sections 120 in the base enclosure 100 and the intra-enclosure power supply sections 220 in the additional enclosures 200 via the breakers 340 and switches 310.

The control circuit 320 is connected to the controller 110 via the signal line L1 such as a LAN (Local Area Network), for example. The control circuit 320 turns a designated switch 3100N or OFF in accordance with a command that is issued by the controller 110. Here, turning switch 3100N means that a conducting state is established by closing the contact of switch 310 and turning switch 310 OFF means that a shutoff state is established by opening the contact of switch 310.

As shown in FIG. 9, the switch box 400 comprises communication control circuits 410 for switching the access destination path. The communication control circuits 410 are connected to the controller 110 via signal line L2. The communication control circuit 410 is connected to the respective additional enclosures 200 via respective signal lines L3. The communication control circuit 410 connects a designated additional enclosure 200 and base enclosure 100 in accordance with an instruction from the controller 110.

FIG. 10 is an explanatory diagram that schematically shows the power supply structure of the storage control device. Part of the constitution is shown omitted from FIG. 10 due to the space constraints of the page.

Figure 11:
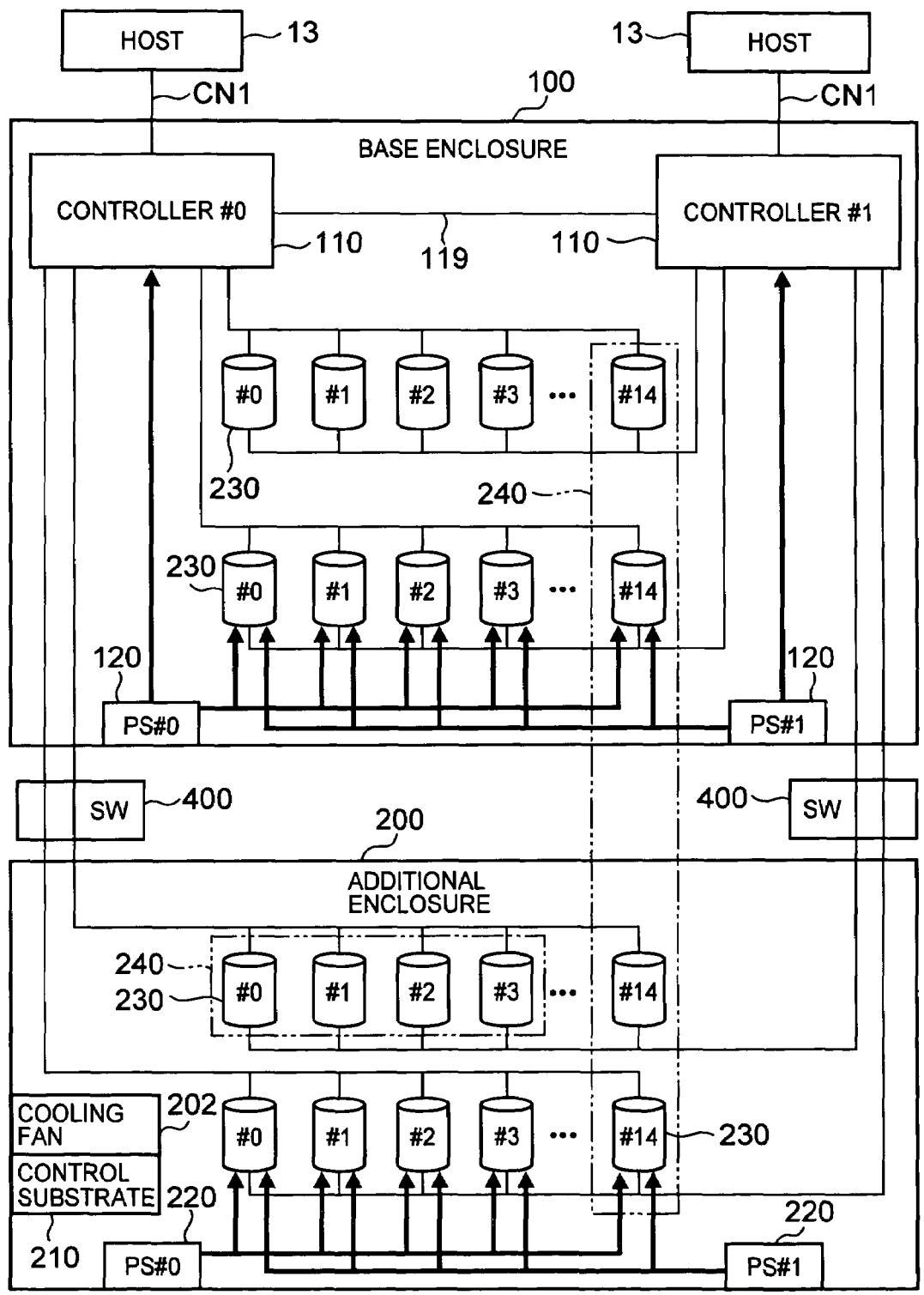
FIG. 11 is an explanatory diagram that shows the constitution of the storage control device in simplified form.
Figure 12:
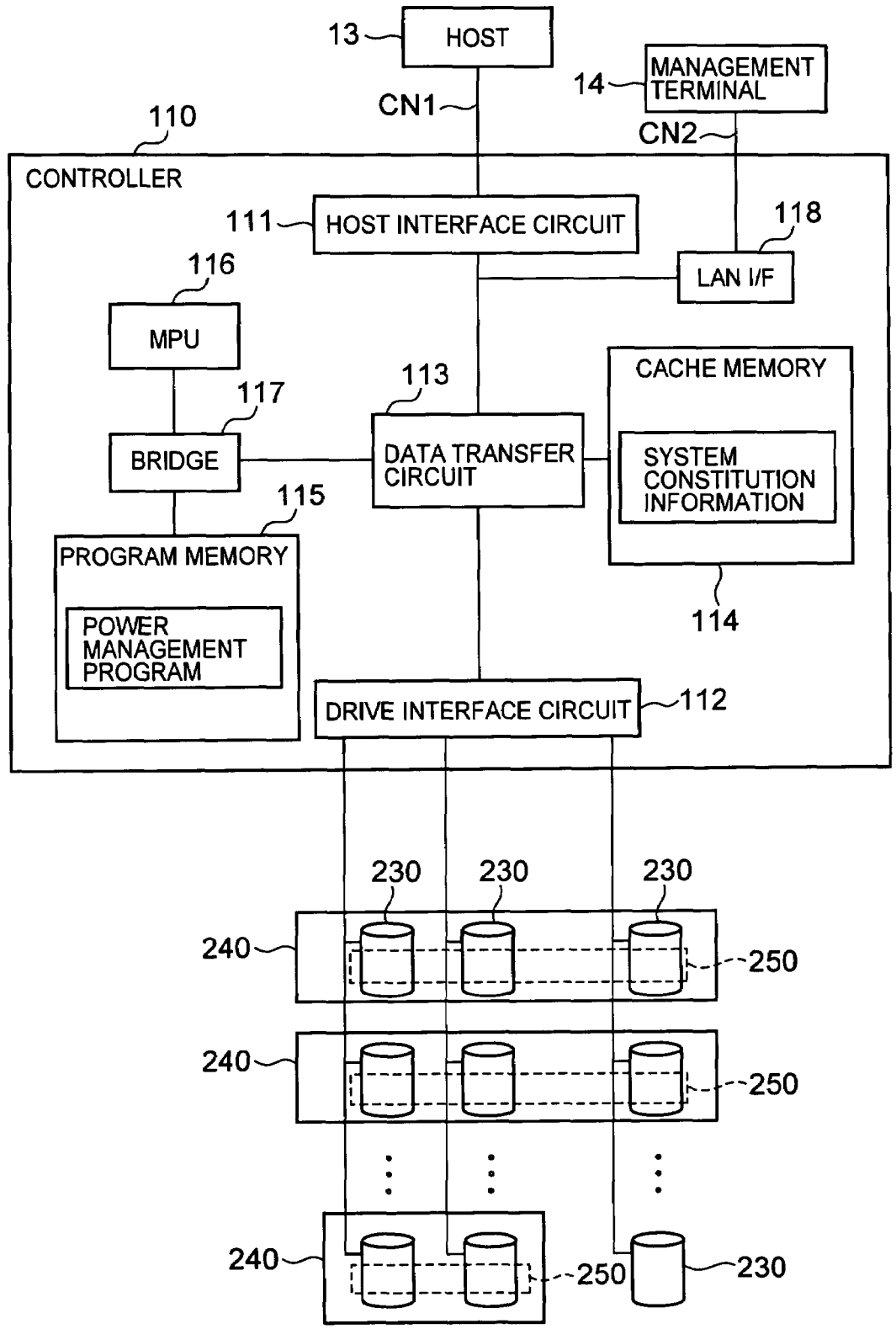
FIG. 12 is an explanatory diagram that shows the constitution of a controller.

FIG. 11 is an explanatory diagram that schematically shows the internal constitution of the storage control device. The respective controllers 110 of the base enclosure 100 are each connected to the host 13 via a communication network CN1. The respective controllers 110 are also connected to the management device 14 via communication network CN2 as shown in FIG. 12.

The host 13 accesses the storage control device in accordance with a request from a client terminal (outside figures), for example and performs data reading and writing. Host 13 can be a mainframe computer or server computer or the like, for example. Communication network CN1 can be a LAN, SAN (Storage Area Network), the Internet, or a dedicated line, for example.

In cases where a LAN is used, the host computer 13 and storage control device communicate in accordance with TCP/IP (Transmission Control Protocol/Internet Protocol). In cases where a SAN is used, the host computer 13 and storage control device communicate in accordance with the Fiber Channel Protocol. In addition, in cases where the host computer 13 is a mainframe computer data transfers are performed in accordance with a communication protocol such as FICON (Fibre Connection: registered trademark), ESCON (Enterprise System Connection: registered trademark), ACONARC (Advanced Connection Architecture: registered trademark), FIBARC (Fibre Connection Architecture: registered trademark), for example.

As explained earlier, the control channel of the storage control device is made redundant as per the power supply system. The primary controller 110 (#0) and secondary controller 110 (#1) is able to access all of the disk drives 230 under their jurisdiction. That is, even when a fault occurs in either system, the disk drives 230 can still be accessed by the other system. The overall operation of the storage control device is controlled by the controller 110 in the base enclosure 100. Hence, the respective controllers 110 are able to access not only each of the disk drives 230 in the base enclosure 100 but also the respective disk drives 230 in the additional enclosures 200.

The respective intra-enclosure power supply sections 120 of the base enclosure 100 supply DC power of a predetermined voltage to each of the disk drives 230 in the respective controllers 110 and the base enclosure 100. The intra-enclosure power supply sections 120 are able to output voltages of a plurality of types such as DC 5 volts and DC 12 volts, for example. Further, although FIG. 11 only shows power being supplied to the lower disk drives 230 for the sake of expedience in the description, the respective intra-enclosure power supply sections 120 supply power to all the disk drives 230 in the enclosure.

The additional enclosures 200 are shown in simplified form in the lower half of FIG. 11. Only one additional enclosure 200 is shown due to the space constraints of the page. As mentioned above, the base enclosure 100 is switch-connected via a plurality of additional enclosure 200 and switch boxes 400.

As per the intra-enclosure power supply sections 120, the intra-enclosure power supply sections 220 of the additional enclosures 200 convert power that is input from the outside to DC power of a predetermined DC voltage and outputs same. DC power is supplied from the respective intra-enclosure power supply sections 220 to all of the disk drives 230, the control substrate 210, and the cooling fan 202 that exist in the enclosure.

For the sake of expedience in the description, the description mentions that DC power is supplied from the respective intra-enclosure power supply sections 220 but, for example, the constitution may also be such that DC power is normally supplied to the respective disk drives 230 and control substrate 210 from only either one of the intra-enclosure power source sections 220 (the primary (#0) intra-enclosure power source section, for example) By treating the impedance when the respective intra-enclosure power source sections 220 are viewed from the perspective of the loads of the disk drives 230 and control substrate 210 and so forth differently, power can be supplied from either intra-enclosure power source section 220. For example, diodes of a larger number of stages than the other intra-enclosure power source section 220 may be provided at the output from either intra-enclosure power source section 220. As a result, when a fault occurs, a switch can be made to the other intra-enclosure power source section 220 automatically without switching a switch.

The disk drives 230 are constituted, for example, as hard disk drives such as ATA (AT Attachment) disks, SCSI (Small Computer System Interface) disks, or FC (Fibre Channel) disks but are not limited to such hard disk drives. A semiconductor memory drive (including flash memory devices), an optical disk drive, a magneto-optical disk drive or other storage devices may also be used, for example.

A RAID group 240 is constituted by disk drives 230 of a predetermined number such as one set of four or one set of eight, for example. The RAID group 240 can be constituted by a plurality of disk drives 230 that exist in separate enclosures or can be constituted by one or a plurality of disk drives 230 that exist in the same enclosure.

As shown in FIG. 12, the RAID group 240 can be provided with one or a plurality of logical volumes 250. The logical volumes 250 are targets that are accessed by the host 13 and which store data that are used by host 13.

FIG. 12 is a block diagram for a case where the emphasis is one controller 110. The controller 110 is constituted comprising, for example, a host interface circuit 111, a drive interface circuit 112, a data transfer circuit 113, a cache memory 114, a program memory 115, a processor ('MPU' in FIG. 12) 116, a bridge 117, and a LAN interface 118.

The host interface circuit 111 controls communications with the host 13. The various commands and data issued by host 13 are received by the host interface circuit 111. A report to the effect that the processing of data and commands read by the disk drives 230 is complete is transmitted to the host 13 by the host interface circuit 111.

The drive interface circuit 112 controls communications with the respective disk drives 230. The drive interface circuit 112 performs an operation to convert logical block addresses (LBA) into the physical addresses of the disk drives 230, or the like.

The data transfer circuit 113 is a circuit for controlling data transfers within the controller 110. The data transfer circuit 113 controls data transfers between the host interface circuit 111 and cache memory 114 and data transfers between the drive interface circuit 112 and cache memory 114.

The processor 116 comprises one or a plurality of processor cores. Processor 116 implements power control (described subsequently) by reading and executing various programs such as the power management program stored in the program memory 115.

The cache memory 114 stores data that are received from the host 13 and data that are read by the host 13. The cache memory 114 also stores information relating to the system constitution of the storage control device. The stored content of the cache memory 114 is backed up by a battery 140. The bridge 117 connects the processor 116 and program memory 115.

The processor 116 is connected to the data transfer circuit 113 via the bridge 117. The LAN interface 118 is a circuit for connecting the management device 14 and controller 110.

Figure 13:
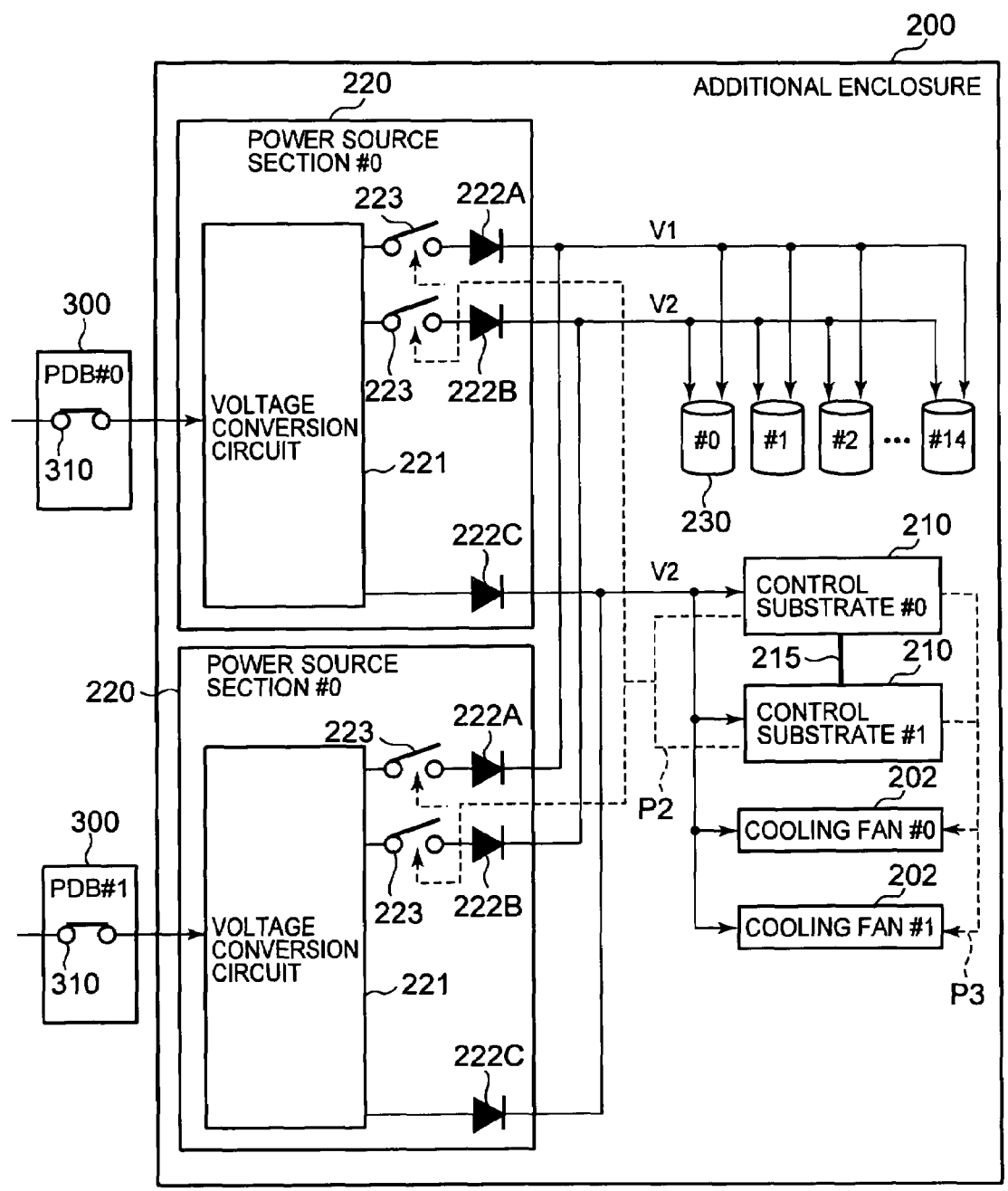
FIG. 13 is an explanatory diagram that shows the constitution of an additional enclosure.

FIG. 13 is a block diagram of an additional enclosure 200. First, the constitution of the intra-enclosure power source section 220 will be described. The intra-enclosure power source section 220 comprises, for example, a voltage conversion circuit 221, a plurality of output diodes 222A to 222C, and an output control switch 223.

The voltage conversion circuit 221 converts the power input via the PDB 300 into DC voltages V1 and V2 of a plurality of types and outputs voltages V1 and V2. V1 is set at around DC 5 volts and V2 is set at around DC 12 volts, for example. The output diodes 222A to 222C are provided for the purpose of backflow prevention. The switch 223 serves to control whether a DC voltage is output and is switched by the control substrate 210.

The respective disk drives 230 have V1 and V2 supplied thereto. The respective control substrates 210 and respective cooling fans 202 have V2 supplied thereto. As shown in FIG. 13, the outputs of the two intra-enclosure power source sections 220 are each OR-connected. Therefore, even when a fault occurs in either intra-enclosure power source section 220, power of a predetermined voltage is supplied to the control substrates 210 and disk drives 230 and so forth by the other intra-enclosure power source section 220. In cases where the outputs V1 and V2 from the respective intra-enclosure power source sections 220 have stopped, the supply of power to all the disk drives 230 in the enclosure is stopped at the same time.

The respective substrates 210 are connected to the respective switches 223 in the respective intra-enclosure power source sections 220 via signal lines P2. The respective substrates 210 are able to individually close each of the switches 223. Further, the respective control substrates 210 are also connected to the respective cooling fans 202 via signal lines P3. The respective control substrates 210 are able to start or stop the operation of the respective cooling fans 202 or regulate the speed thereof.

Figure 14:
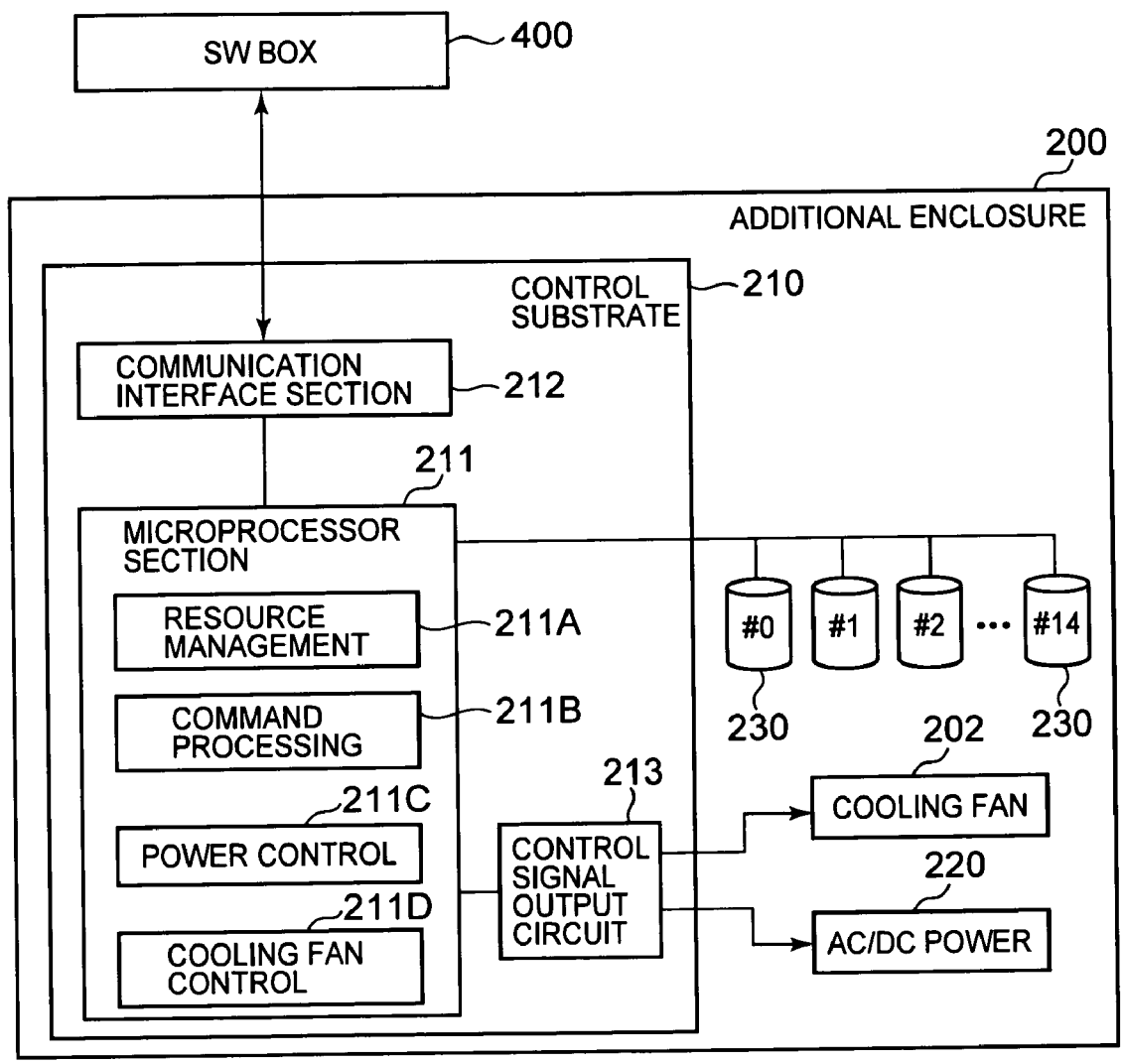
FIG. 14 is an explanatory diagram that shows the constitution of a control substrate.

FIG. 14 is an explanatory diagram to illustrate a constitution with an emphasis on one control substrate 210. The control substrate 210 is constituted comprising, for example, a microprocessor section 211, a communication interface section 212, and a control signal output circuit 213.

The microprocessor section 211 controls the operation of the control substrate 210 and implements a resource management function 211A, a command processing function 211B, a power control function 211C, and a cooling fan control function 211D, respectively, for example.

The resource management function 211A is a function for managing the disposition and states and so forth of the respective resources in the additional enclosure 200 (disk drives 230 and intra-enclosure power source sections 220, and so forth), for example. The command processing function 211B is a function for executing an instruction that is input by the controller 110. In other words, the command processing function 211B writes data to a designated address of the designated disk drive 230 in cases where there is a request to write data from the controller 110. Further, the command processing function 211B reads data of the designated length from the designated address of the designated disk drive 230 in cases where there is a request to read data from the controller 110 and transfers the data thus read to the controller 110.

The power control function 211C is a function for controlling the output of the intra-enclosure power source section 220 by opening and closing the switch 223 on the basis of an instruction from the controller 110. The cooling fan control function 211D is a function for controlling the operation of the cooling fan 202 on the basis of an instruction from the controller 110.

The communication interface section 212 performs communications with the base enclosure 100 via the switch box 400. Commands and data that are output by the controller 110 of the base enclosure 100 are input to the communication interface section 212 via the switch box 400.

FIG. 15 is an explanatory diagram that shows the constitution of Table T1 for managing the logical volume 250. This table T1 constitutes information on the constitution of the storage control device in addition to the power savings management table T2 shown in FIG. 16. Each of these tables T1 and T2 are stored in the cache memory 114, for example.

The volume management table T1 associates and manages items such as the volume number (LU#) C11, the capacity C12, the RAID group number C13, the RAID level C14, the drive number list C15, and the latest access time C16, for example. Further, the constitution may be one that manages items other than those shown in FIG. 15. The constitution may also be such that Table T1 is divided up into a plurality of tables and managed.

The logical volume number C11 is identification information for uniquely specifying all of the logical volumes 250 provided in the storage control device. The capacity C12 is information indicating the stored content of the logical volume 250. The RAID group number C13 is identification information for uniquely specifying RAID group 240 in which the logical volume 250 is provided. The RAID level C14 is information indicating the RAID level of the RAID group 240. RAID levels can include, for example, RAID1, RAID5, and RAID6, and so forth. The drive number list C15 is information for specifying the disk drives 230 that constitute the RAID group 240. The latest access time C16 is information indicating the time when the host 13 last accessed the logical volume 250. Further, although not shown due to the space constraints of the page, the access frequency of each predetermined time and the spare capacity of the respective logical volumes 250 and so forth can also be managed by table T1, for example.

FIG. 16 is an explanatory diagram showing a power savings management table T2 for managing the power supply states of the respective enclosures 100 and 200. The power savings management table T2 associate and manage, for each number C21 of the switch box 400, for example, the enclosure number C22, drive number C23, the spin state C24, the switch (abbreviated to 'SW' in FIG. 16) number C25 of the respective PDB 300, the switch state C26, the supply state C27 that shows whether power is supplied to the enclosure, the cascade connection state C28, and the diagnosis result C29.

The switch box number C21 is identification information for uniquely specifying the respective switch boxes 400. The enclosure number C22 is identification information for uniquely specifying the respective enclosures 100 and 200. The drive number C23 is identification information for specifying the respective disk drives 230 provided in the enclosure.

The spin state C24 is information indicating whether the disk drives 230 are in a spinup state or spindown state. A case where a disk drive 230 is in a spinup state is indicated by 'ON' and a cases where the disk drive 230 is in a spinoff state is indicated by 'OFF'. The spinup state is a state where the disk is rotating at a predetermined speed and where data can be read or written. A spindown state is a state where the disk is rotating or stopped at a predetermined speed or less and reading and writing cannot be performed in that state.

The PDB switch number C25 is information for specifying the switches 310 of the respective PDB 300 connected to the enclosure. The switch state C26 is information indicating the open or closed state of the switch 310 specified in C25. A case where switch 310 is closed is indicated by 'ON' and a state where switch 310 is open is indicated by 'OFF'.

The power supply state C27 to the enclosure is information indicating whether power is supplied to the enclosure. In cases where power is being supplied, "ON" is set and, in cases where the supply of power is stopped, "OFF" is set. Further, a state where the supply of power to the switch box 400 that is connected to the enclosure is also indicated at the same time by C27. A state where the supply of power is stopped is called a 'power savings state' or 'power savings mode' in this embodiment.

The cascade state C28 displays the number of the cascade-connected switch box 400. For example, let us say that, in cases where the switch box 400 (#2) is cascade-connected to the switch box 400 (#1), '#1' which is the connection source is set to the cascade state C28 in row 400 (#2). The diagnosis result C29 indicates a diagnosis result with respect to whether the respective enclosures 100 and 200 and so forth are operating normally. The diagnosis result C29 records the diagnosis date and whether the diagnosis is good or bad, for example.

Figure 17:
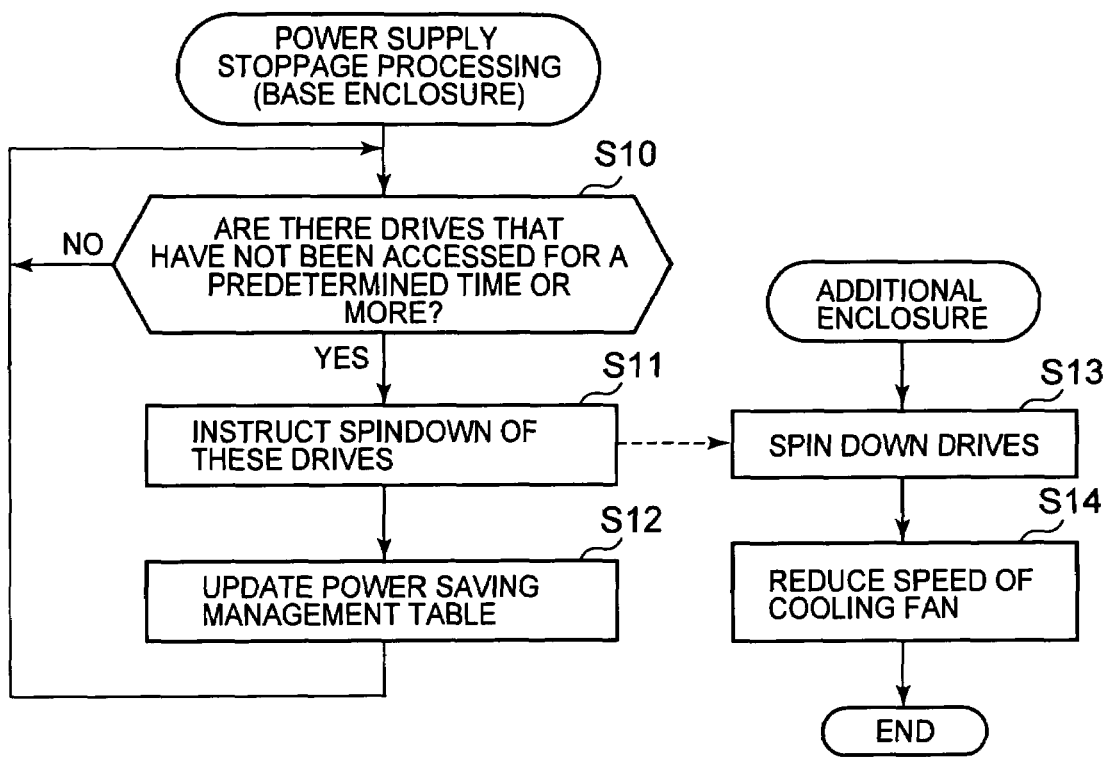
FIG. 17 is a flowchart that shows processing to save power for each drive.

FIG. 17 is a flowchart indicating the power supply stoppage processing for establishing a spindown state for the disk drive 230.

The controller 110 judges whether the disk drive 230 that has not been accessed for a predetermined time exists by referencing Table T1 (S10). The user is able to set an optional value as the predetermined time, such as one hour, for example.

In cases where a disk drive 230 that has not been accessed for a predetermined time or more has been detected (S10: YES), the controller 110 issues an instruction to change the disk drive 230 to a spindown state to the additional enclosure 200 in which the disk drive 230 exists (S11). The controller 110 makes the spin state of the disk drive 230 detected in S10 a spinoff state and records this state in Table T2 (S12). The instruction (command) issued by the controller 110 is transmitted to the intended additional enclosure 200 via the switch box 400.

The control substrate 210 of the additional enclosure 200 that received the instruction from the controller 110 spins down the designated disk drive 230 (S13). Further, the control substrate 210 reduces the speed of the cooling fan 202 if possible (S14).

For example, in cases where another disk drive 230 is operating in the enclosure, the speed of the cooling fan 202 is kept at a fixed value in order to maintain the temperature in the enclosure. In contrast, in S13, in cases where the cooling performance can be reduced by spinning down one or a plurality of disk drives 230, the control substrate 210 is also able to reduce the speed of the cooling fan 202. Further, the decision of whether to reduce the speed of the cooling fan 202 may be determined by the controller 110 or by the control substrate 210 of the additional enclosure 200.

Figure 18:
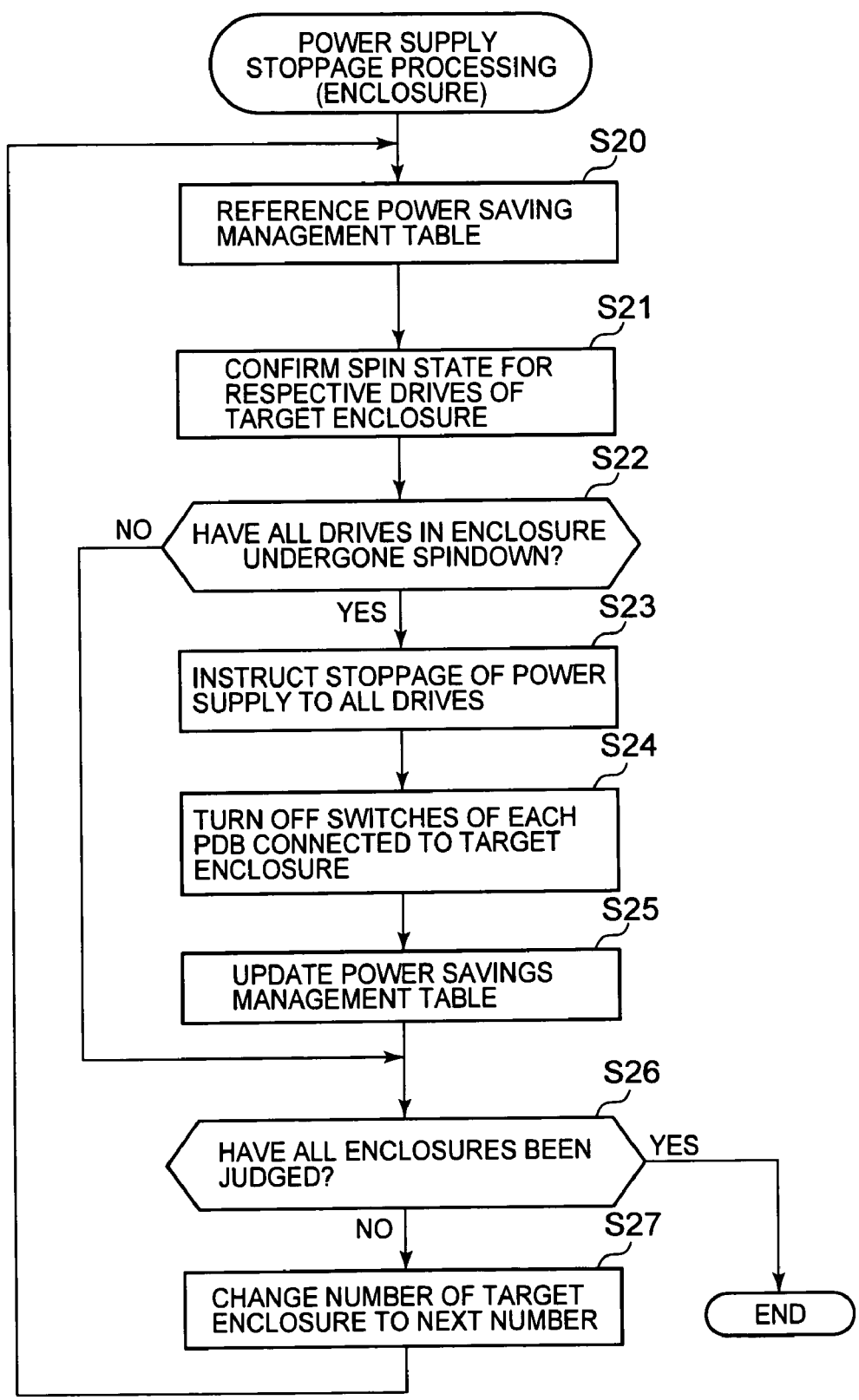
FIG. 18 is a flowchart that shows processing to stop the power supply for each additional enclosure.

FIG. 18 is a flowchart that shows power supply stoppage processing for stopping the supply of power in enclosure units.

The controller 110 references Table T2 (S20) and confirms the spin state of each disk drive 230 in the target enclosure (S21). In cases where it is judged that all the disk drives 230 in the target enclosure are in a spindown state (S22: YES), the controller 110 issues an instruction to stop the transmission of power of all the disk drives 230 to the control substrate 210 of the target enclosure (S23). The control substrate 210 of the target enclosure stops the outputs V1 and V2 by opening the switch 223 in the intra-enclosure power source section 220 and stops the transmission of power to all the disk drives 230 in the enclosure. In this case, the controller 110 is able to request stoppage of the cooling fan 202 in addition to the stoppage of the transmission of power to all the disk drives 230.

The controller 110 turns off the switch 310 of the respective PDB 300 connected to the target enclosure (S24). As a result, the supply of power to the target enclosure is completely stopped. The controller 110 updates C26 and C27 of Table T2 (S25).

The controller 110 judges whether all the enclosures in the storage control device have been judged (S26) and, in cases where unjudged enclosures exist (S26: NO), changes the target enclosure to the next enclosure (S27). Further, the controller 110 repeats S20 to S26.

Figure 19:
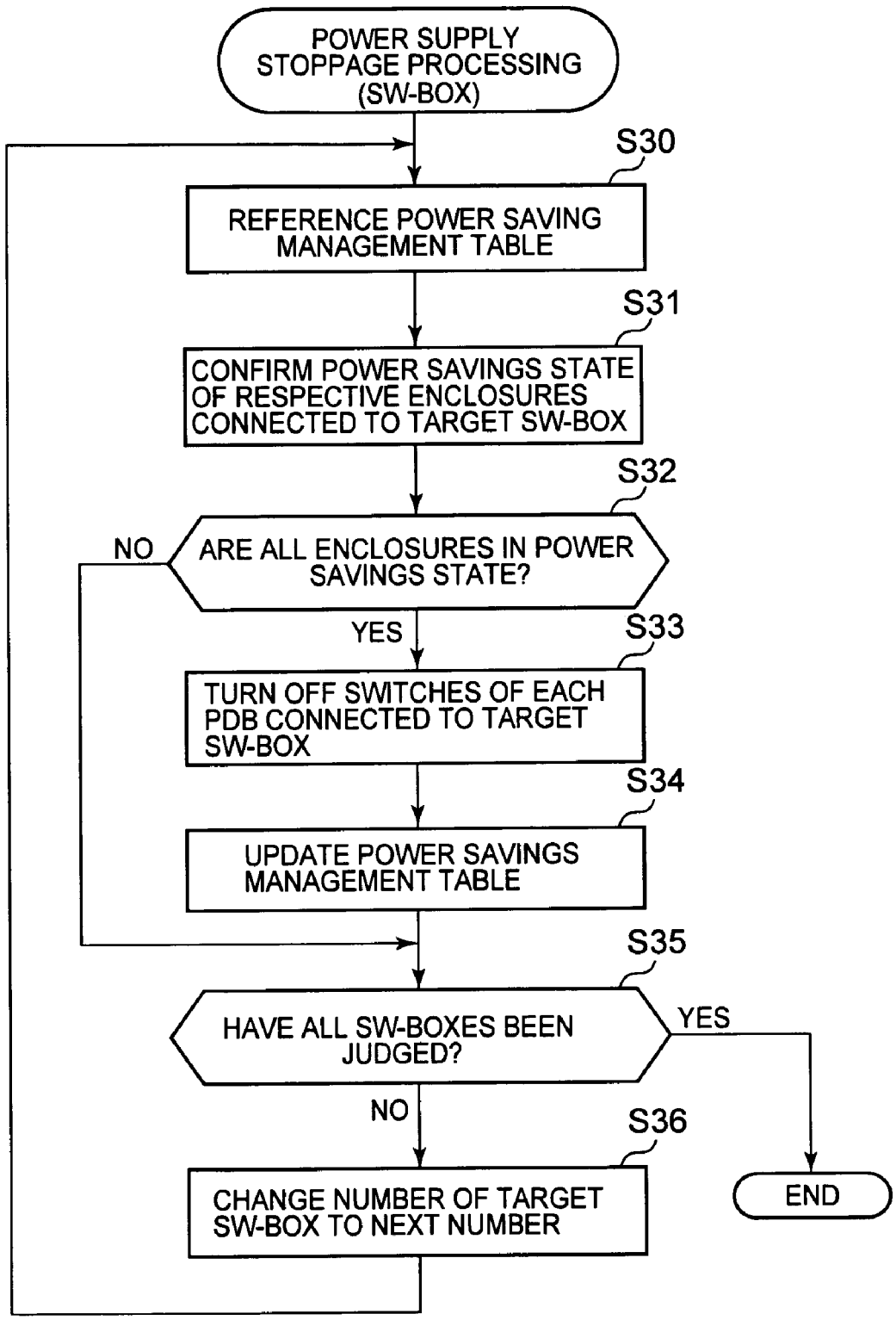
FIG. 19 is a flowchart that shows processing to stop the power supply for each switch box.

FIG. 19 is a flowchart showing power supply stoppage processing for stopping the supply of power to the switch box 400.

The controller 110 references Table T2 (S30) and confirms the power savings state of each enclosure that is connected to the target switch box (S31). In cases where all of the enclosures connected to the target switch box are set to the power savings mode (S32: YES), the controller 110 turns OFF the switch 310 of the respective PDB 300 connected to the target switch box (S33). As a result, the supply of power to the target switch box stops completely. Further, the controller 110 updates C26 and C27 of Table T2 (S34).

The controller 110 judges whether all the switch boxes in the storage control device have been judged (S35) and, in cases where an unjudged enclosure exists (S35: NO), the controller 110 updates the target enclosure to the next enclosure (S36). The controller 110 then repeats S30 to S35.

Figure 20:
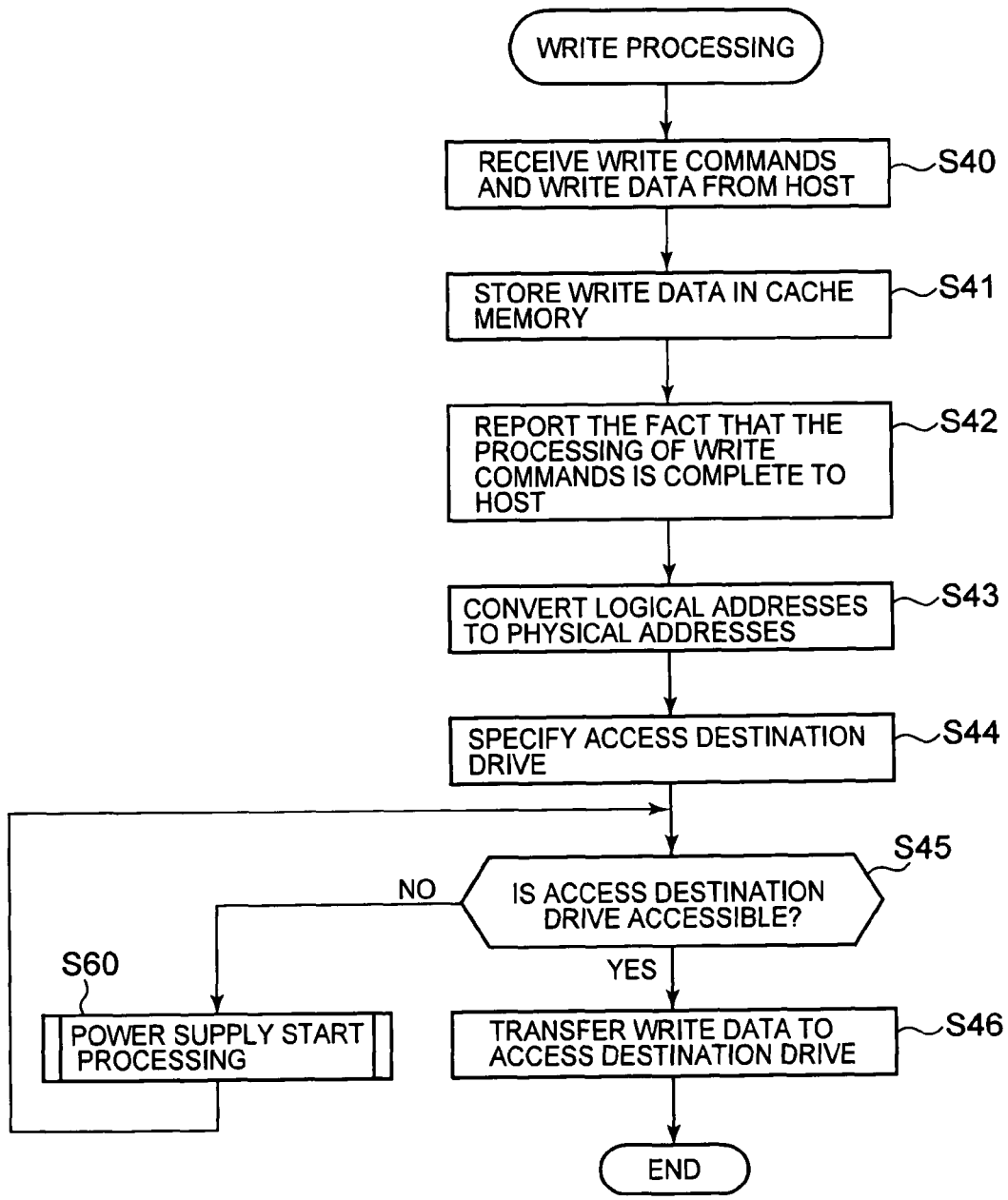
FIG. 20 is a flowchart that shows write processing.

FIG. 20 shows the flowchart for processing write commands issued by the host 13. Upon receipt of a write command and write data from the host 13 (S40), the controller 110 stores the write data in the cache memory 114 (S41). The controller 110 reports that the processing of write commands to the host 13 is complete at the point where the write data are stored in the cache memory 114 (S42). The controller 110 converts the logical address specified by the write command into the physical address of a disk drive 230 (S43) and specifies the access target disk drive 230 (S44). In the following description, the access target disk drive 230 is sometimes expediently expressed as the access destination drive.

The controller 110 judges whether it is possible to access the access destination drive specified in S44 by using Table T2 (S45). In cases where the access destination drive is in the spinup state, the access destination drive can be accessed immediately. In cases where it is judged that the access destination drive is accessible (S45: YES), the controller 110 transfers the write data to the access destination drive (S46). The write data are transmitted to the additional enclosure 200 comprising the access destination drive via the switch box 400. Upon receipt of the write data, the control substrate 210 writes write data to the designated disk drive 230 (access destination drive).

In contrast, in cases where it is judged that access to the access destination drive is impossible (S45: NO), the power supply start processing described subsequently is executed (S60). Thus, in this embodiment, before the write data are transferred to the access destination drive, it is judged whether the access destination drive is accessible and, when access is impossible, power supply start processing is executed. Instead, power supply start processing can also be executed in cases where the writing of write data to the access destination drive has not been possible.

Figure 21:
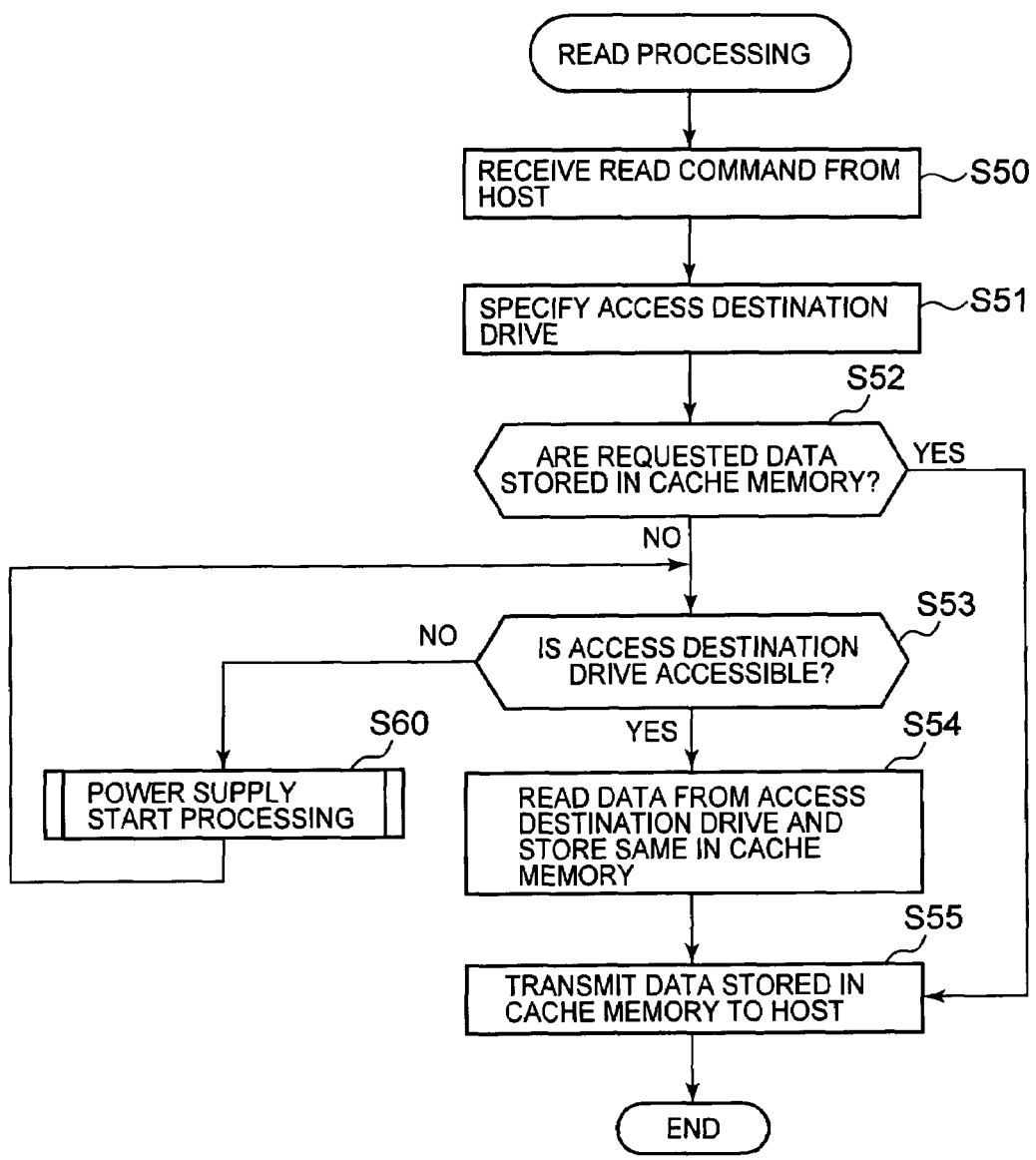
FIG. 21 is a flowchart that shows read processing.

FIG. 21 shows a flowchart for processing read commands issued by the host 13. Upon receipt of a read command from the host 13 (S50), the controller 110 specifies an access destination drive (S51). The access destination drive here is the disk drive 230 that stores the data for which reading has been requested.

The controller 110 judges whether the data requested by the host 13 are stored in the cache memory 114 (S52). In the following description, data for which reading has been requested by the host 13 are sometimes called read data.

In cases where read data are stored in the cache memory 114 (S52: YES), the subsequent steps S53 and S54 are skipped and the read data stored in the cache memory 114 are transmitted to the host 13 (S55).

In cases where read data are not stored in the cache memory 114 (S52: NO), the controller 110 judges whether the access destination drive is accessible by using Table T2 (S53). In cases where it is judged that the access destination drive is accessible (S53: YES), the controller 110 reads read data from the access destination drive and stores same in the cache memory 114 (S54). The controller 110 transmits the read data which are stored in the cache memory 114 to the host 13 (S55). In contrast, in cases where it is judged that access to the access destination drive is impossible (S53: NO), the controller 110 executes power supply start processing (S60).

Figure 22:
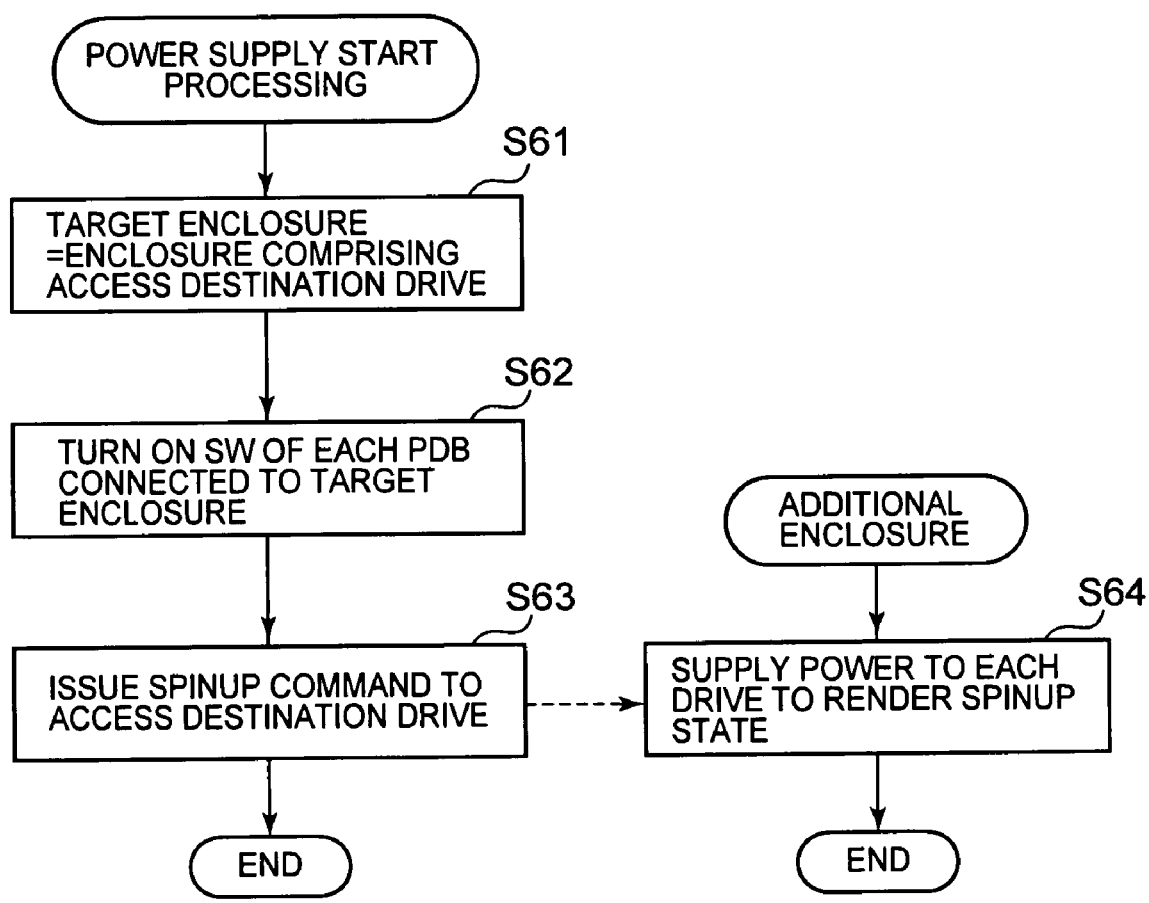
FIG. 22 is a flowchart that shows processing in a case where the power supply is started.

FIG. 22 is a flowchart showing the details of power supply start processing (S60). The controller 110 sets the number of the additional enclosure 200 comprising the access destination drive as the number of the target enclosure (S61).

The controller 110 sets the switches 310 in the PDB 300 of each system connected to the target enclosure to the ON position to supply power to the target enclosure (S62). Thereafter, the controller 110 transmits a command for spinning up the access destination drive to the target enclosure (S63). The target enclosure control substrate 210 starts up the access destination drive and spins up same in accordance with the command from the controller 110 (S64).

Figure 23:
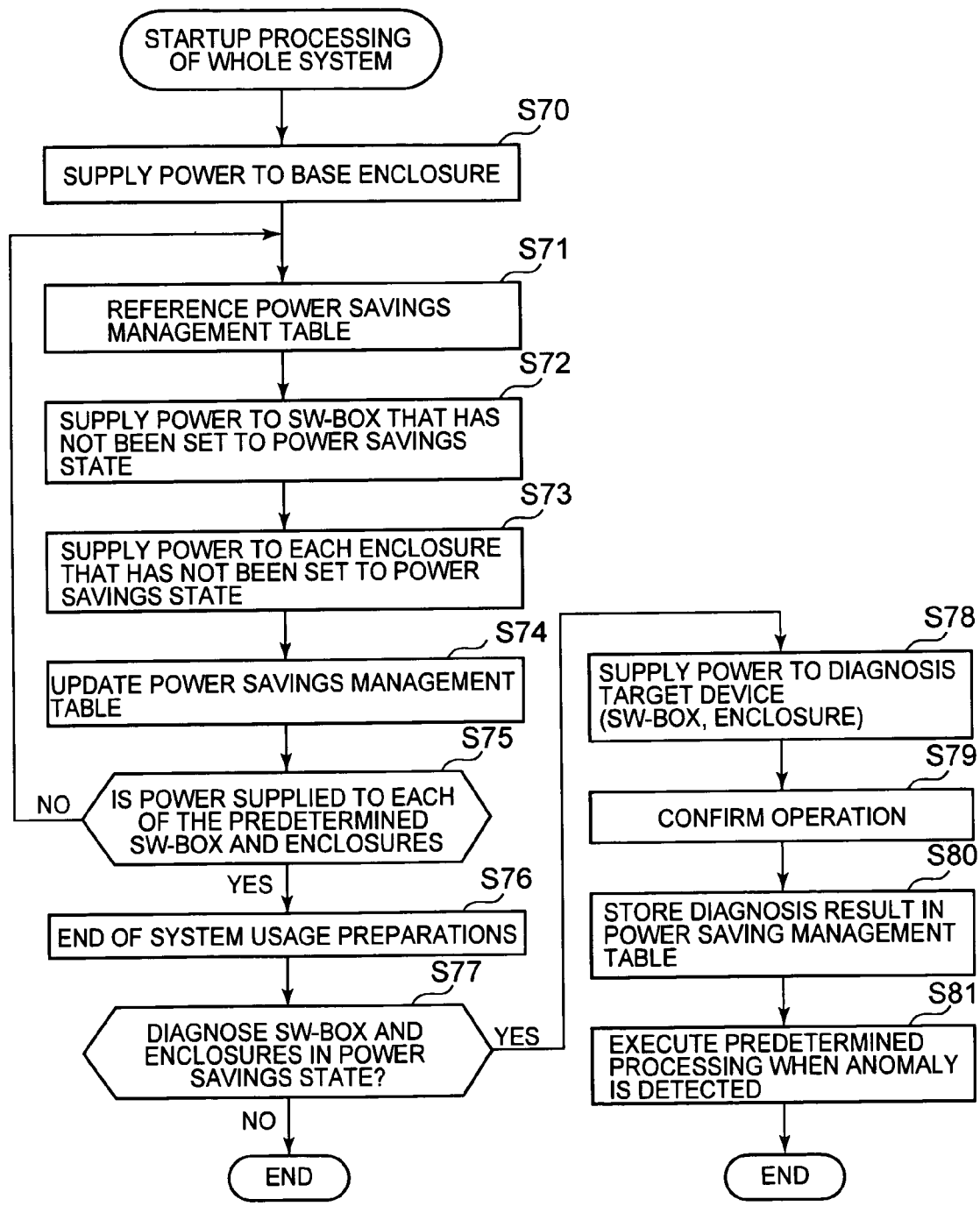
FIG. 23 is a flowchart that shows processing in a case where the storage control device is started up.

FIG. 23 is a flowchart that shows the processing to start up the whole storage control device system. The user first supplies power to the base enclosure 100 (S70). As a result, the controller 110 starts up and each of the following steps are executed.

The controller 110 references Table T2 (S71) and supplies power from the PDB 300 to the switch boxes 400 which have not been set to the power savings mode (S72). Likewise, the controller 110 supplies power from the PDB 300 to the respective enclosures 200 that have not been set to the power savings mode (S73). The controller 110 updates Table T2 for the switch boxes 400 and enclosures 200 to which the power is supplied (S74). That is, in this embodiment, during the previous stoppage of the storage control device system, power is not supplied to the switch boxes 400 and enclosures 200 that have been set to the power savings mode during the startup of the storage control device system.

The controller 110 confirms whether or not power has been supplied to each of the devices which are to be supplied with power and same have started up, that is, to the switch boxes 400 and enclosures 200 which have not been set to the power savings mode (S75). If it is confirmed that power has been supplied to the respective devices which are to be supplied with power (S75: YES), the controller 110 confirms that the preparations for using the storage control device system are complete and reports same to the management device 14 (S76).

In addition, the controller 110 judges whether the switch boxes 400 and enclosures 200 that have been set to power savings mode have been diagnosed (S77). For example, because a fault cannot be detected even when a fault occurs in the additional enclosure 200 when the transmission of power has stopped in cases where the transmission of power to the additional enclosures 200 that store data with a low access frequency such as backup data has been stopped for a long time, there is the possibility that data will not be extracted when required.

Therefore, in this embodiment, it is confirmed whether the operation is normal by transmitting power to the resting additional enclosures 200 and switch boxes 400 at regular or irregular intervals. This self-diagnosis processing can also be performed regularly with a predetermined cycle that is preset and can be performed irregularly at times that are optionally set by the user. The result of the diagnosis is recorded in Table T2.

If the start of self-diagnosis is determined (S77: YES), the controller 110 supplies power to the diagnosis target devices (switch boxes and additional enclosures) to start up these devices (S78). The controller 110 confirms whether the self-diagnosis devices are operating normally in accordance with the presence or absence of a normal response to a command (S79). The controller 110 registers the diagnosis result and diagnosis date and time in C29 of Table T2 (S80). If an abnormal state is detected, the controller 110 performs predetermined error detection processing (S81). In the error detection processing, information relating to a device in which an abnormality has been detected is transmitted to the management device 14, for example.

Figure 24:
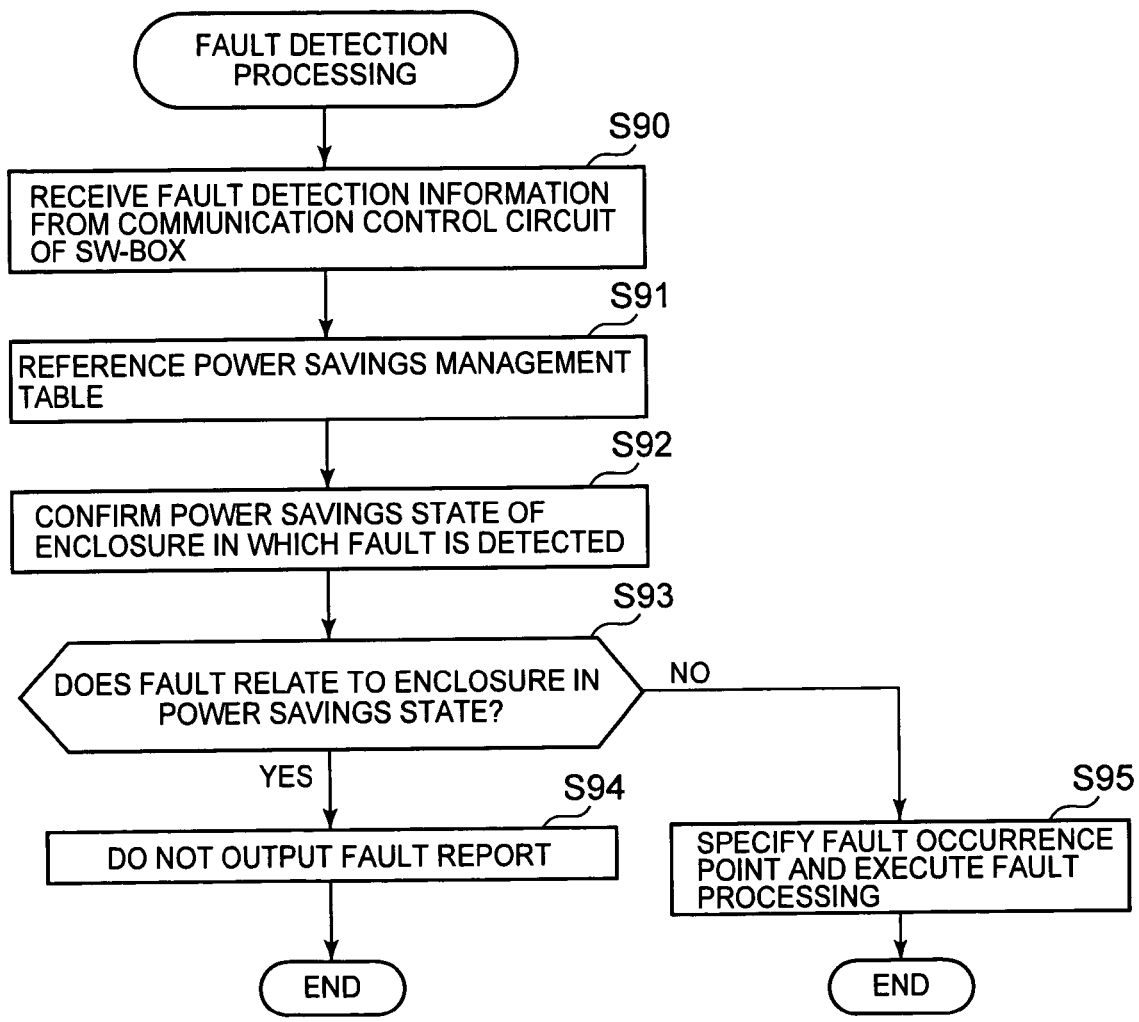
FIG. 24 is a flowchart that shows fault detection processing.

FIG. 24 is a flowchart showing processing for detecting a fault. The communication control circuit 410 in the switch box 400 reports the occurrence of a fault to the controller 110 in cases such as where communication with the additional enclosure 200 has not been possible, for example. Upon receipt of information relating to the detection of a fault from the switch box 400 (S90), the controller 110 references Table T2 (S91) and confirms the power savings state of the additional enclosure 200 in which the fault was detected (S92).

The controller 110 judges whether a fault reported by the switch box 400 is a fault relating to a enclosure 200 that has been set to power savings mode (S93). In cases where the fault is a fault relating to an enclosure 200 that has been set to power savings mode (S93: YES), the controller 110 does not treat the fault reported by the switch box 400 as a fault and does not report the occurrence of a fault to the management device 14 (S94). This is because a situation where the switch box 400 is unable to communicate with an enclosure 200 to which the supply of power has been stopped is to be expected. In contrast, in cases where the fault reported by the switch box 400 is a fault relating to an enclosure 200 that has not been set to power savings mode (S93: NO), the controller 110 specifies the occurrence of a fault and executes fault processing as will be mentioned subsequently (S95).

Figure 25:
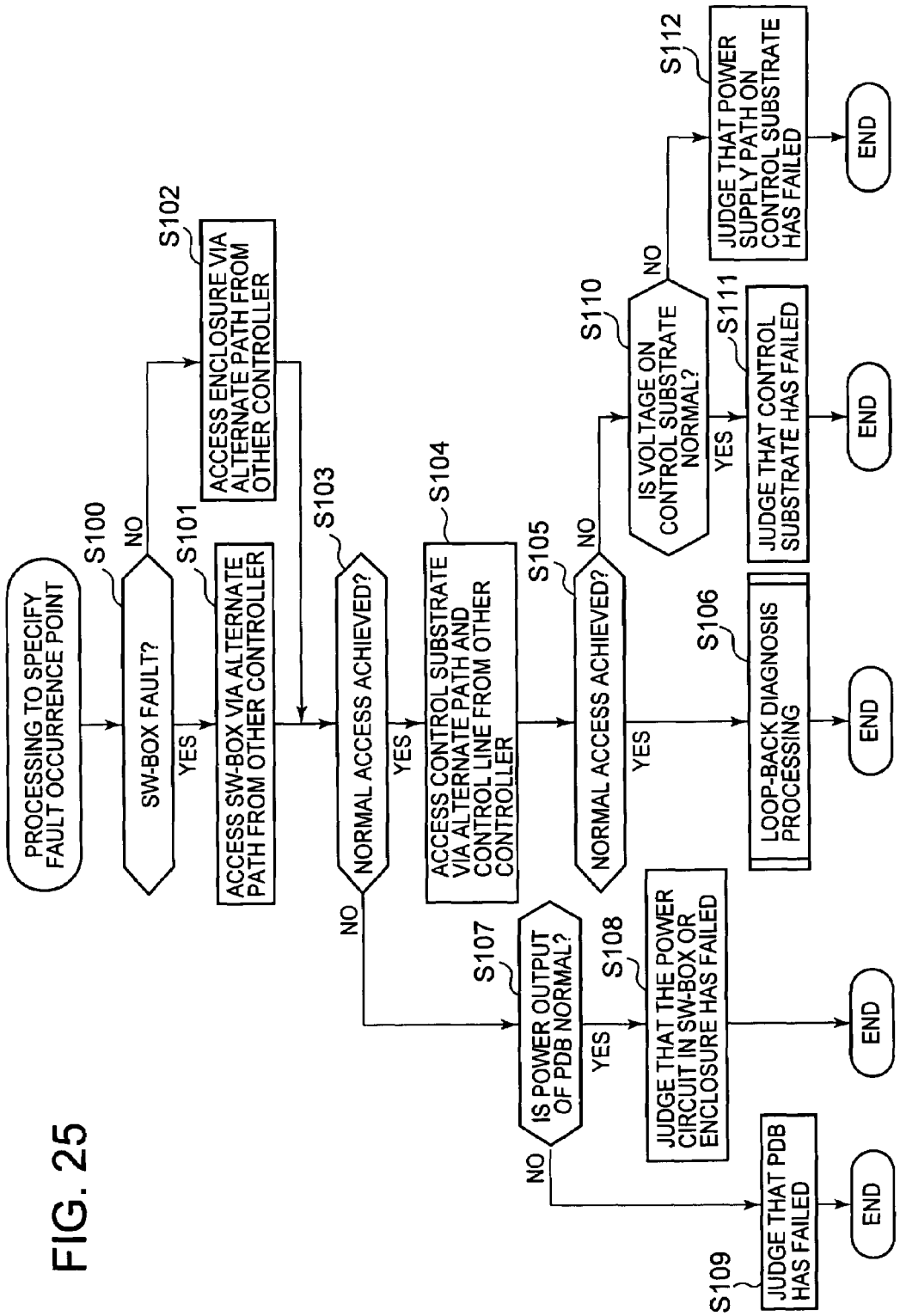
FIG. 25 is a flowchart that shows processing to specify a fault generation point.

FIG. 25 is a flowchart showing processing for specifying the point where a fault occurs. In the following description, the description will focus on a case where the device which is the reporting source that reported the fault occurrence to the controller is a switch box 400 and the fault is detected with the primary channel.

There are also cases where the reporting source device is known as a diagnosis target device. Possible diagnosis target devices include the switch box 400 and additional enclosure 200. In cases where the diagnosis target device is an additional enclosure 200, that is, in cases where the device that reports the occurrence of a fault to the controller is an additional enclosure 200, the communication control circuit 410 may be re-read as the control substrate 210 in the following description where necessary.

The controller 110 judges whether the detected fault is a fault with the switch box 400 (S100). In FIG. 24, although a case where the switch box 400 detects the occurrence of a fault and reports the fault to the controller 110 is illustrated, the respective additional enclosures 200 have a function for detecting the occurrence of respective faults and reporting same to the controller 110. In cases where information for reporting a fault occurrence is received, the controller 110 discriminates whether the reporting source is a switch box 400 or an additional enclosure 200 (S100).

In cases where the occurrence of a fault is reported by the switch box 400 (S100: YES), access to the switch box 400 is attempted via an alternate path L2 (#1) by another controller 110 (#1) (S101). In cases where the fault occurrence is reported by an additional enclosure 200 (S100: NO), access to the switch box 400 is likewise attempted via an alternate path L2 (#1) by another controller 110 (#1) (S102).

Figure 27:
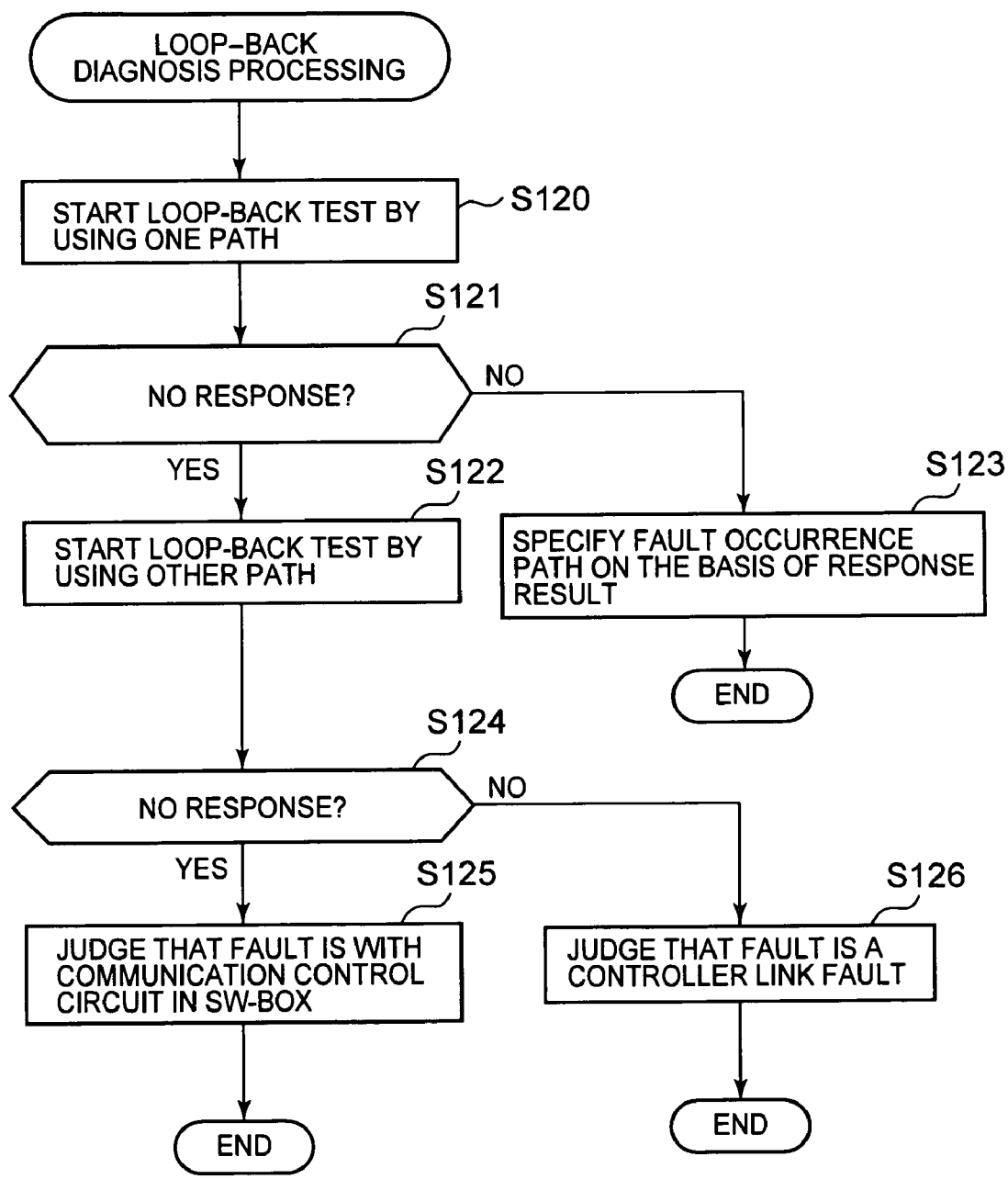
FIG. 27 is a flowchart showing loop-back diagnosis processing.

It is judged whether the device that reported the fault occurrence to the controller was accessed normally via the alternate path L2 (#1) (S103). In cases where normal access has been possible (S103: YES), access to the primary control substrate 210 (#0) is attempted by the other controller 110 (#1) via the alternate path L2 (#1) and the control lines 411 and 215 (S104). In cases where it has been possible to access the primary control substrate 210 (#0) (S104: YES), the loopback diagnosis processing shown in FIG. 27 is executed (S106). Loop-back diagnosis processing will be described subsequently.

In cases where a 'NO' is judged in S103, the controller 110 judges whether power is being output normally by the PDB 300 that is connected to the diagnosis target device (S107). In cases where the PDB 300 is operating normally (S107: YES), the controller 110 judges that the power source section 420 of the switch box 400 has failed (S108). In cases where the diagnosis target device is an additional enclosure 200, the power source section 220 is judged to have failed (S108). In contrast, in cases where power is not being output normally by the PDB 300 (S107: NO), the controller 110 judges that the PDB 300 has failed (S109).

In cases where 'NO' is judged in S105, the controller 110 judges whether the voltage on the substrate of the switch box 400 is normal (S110). In cases where the voltage on the substrate is normal (S110: YES), the controller 110 judges that the communication circuit part (EXP) has failed (S111). In cases where the voltage on the substrate is not normal (S110: NO), the controller 110 judges that the fault has occurred on the power source path on the substrate (S112).

Figure 26A:
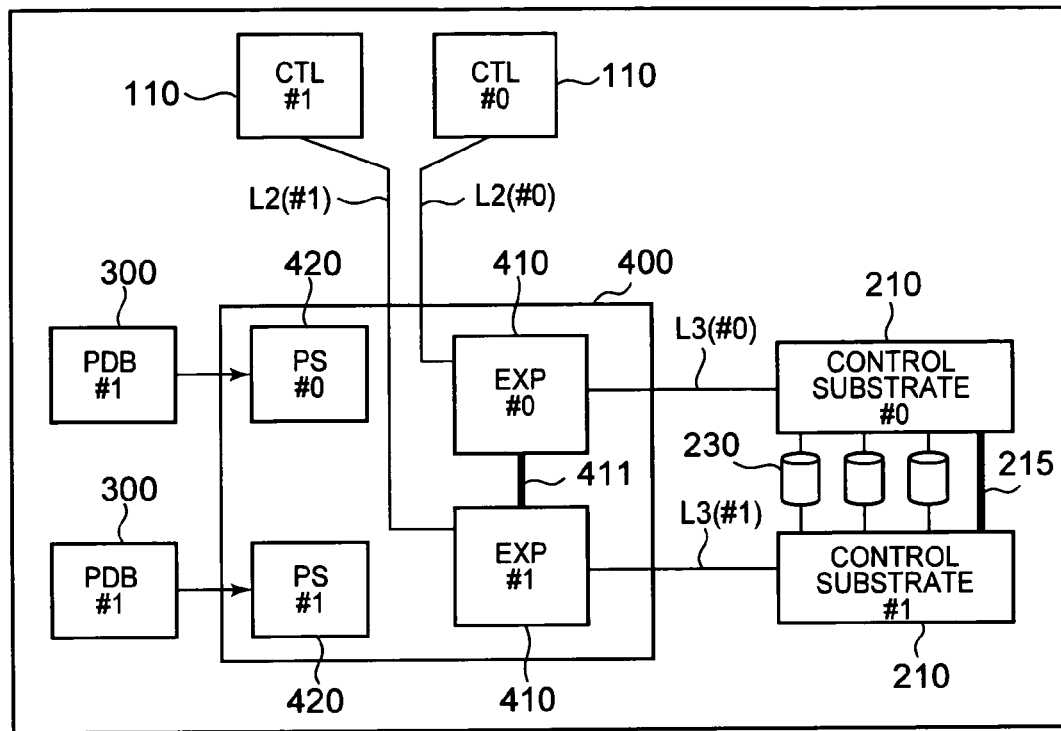
FIG. 26 is an explanatory diagram serving to illustrate an aspect in which a fault is specified.

FIG. 26 is an explanatory diagram that shows an example in which the fault occurrence point is specified. A case where the primary communication control circuit 410 (#0) of the switch box 400 has failed is described. FIG. 26A shows a state where the occurrence of a fault is reported by the switch box 400.

First, it is examined whether normal access can be performed by using the secondary system (S101). The controller 110 (#1) is able to access the secondary communication control circuit 410 (#1) and the secondary control substrate 210 (#1) via the alternate path L2 (#1) (S103: YES).

Thereafter, the controller 110 (#1) attempts to access the primary control substrate 210 (#0) via the alternate path L2 (#1), the secondary communication control circuit 410 (#1), the secondary control substrate 210 (#1) and the control line 215 (S104). That is, it is examined whether it is possible to access the primary control substrate 210 (#0) by bypassing the primary communication control circuit 410 (#0).

Figure 26B:
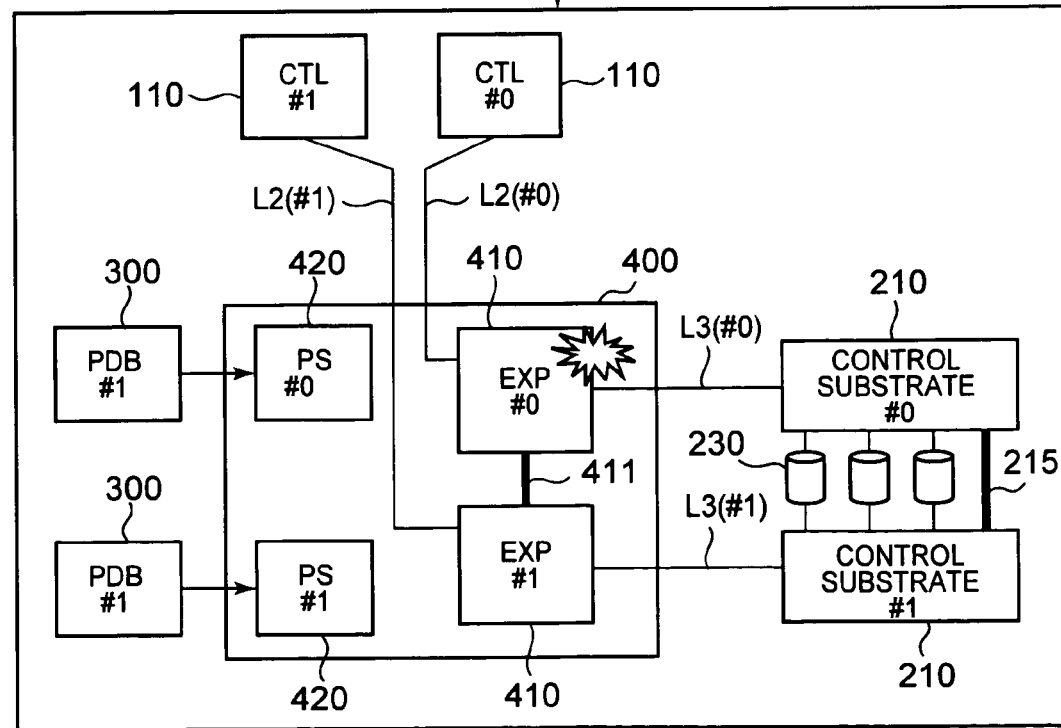

As shown in FIG. 26B, in cases where the primary control substrate 210 (#0) can be accessed if the primary communication control circuit 410 (#0) is bypassed (S105: YES), it can be judged that the primary communication control circuit 410 (#0) has failed. Therefore, loop-back diagnosis processing is executed.

FIG. 27 is a flowchart showing loop-back diagnosis processing. The controller 110 starts a loop-back test by using a primary path (S120) and judges whether there has not been a response (S121). When there has been a response (S120: NO), the controller 110 specifies the path on which the fault occurred on the basis of the response result (S123).

In cases where there has been no response (S121: YES), the controller 110 starts a loop-back test by using the secondary path (S122) and judges whether there has been no response (S123). In cases where there has been no response (S124: YES), the controller 110 judges that the communication control circuit 410 in the switch box 400 has failed (S125). In cases where there has been a response (S124: NO), the controller 110 judges that a link fault has occurred in the communication path L2 between the controller 110 and switch box 400 (S126).

Figure 28:
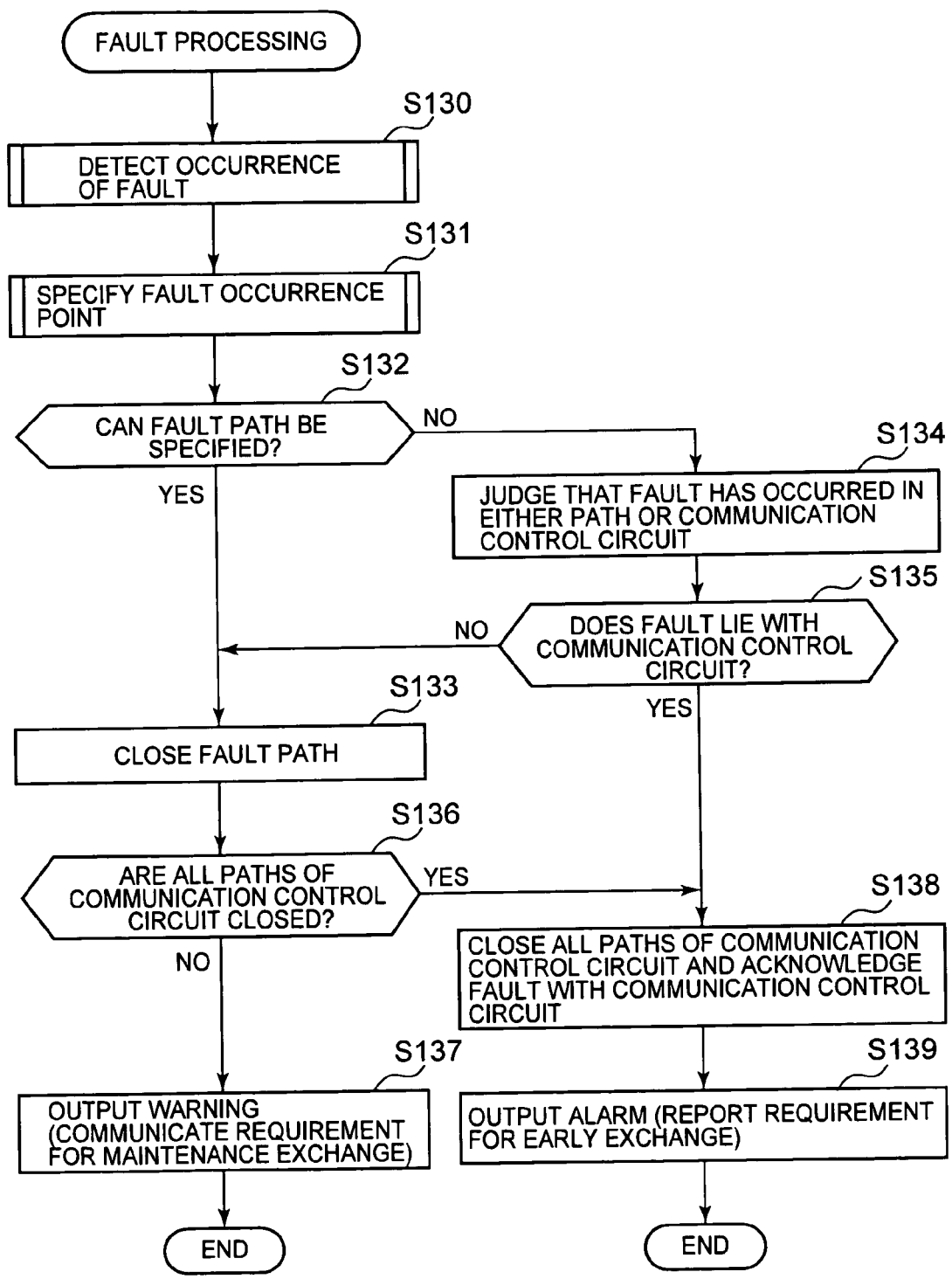
FIG. 28 is a flowchart showing the whole of the fault processing.

FIG. 28 is a flowchart that provides an overview of fault processing for detecting a fault, specifying the point where the detected fault occurred and making an association with the specified fault. First, the fault that occurred in the storage control device is detected by means of the processing shown in FIG. 24 (S130). Thereafter, the point where the fault occurred is specified by means of the processing shown in FIG. 25 (S131).

The controller 110 judges whether it has been possible to specify the path in which the fault occurred (also called the 'fault path' hereinbelow) (S132). In cases where it has been possible to specify the fault path (S132: YES), the controller 110 closes the fault path (S133).

In cases where it has not been possible to specify the fault path (S132: NO), the controller 110 obtains fault information by means of communication between the respective communication control circuits 410 (#0, #1) and between the respective control substrates 210 (#0, #1) and judges whether a fault has occurred in either the path or communication control circuit 410 on the basis of the fault information.

In cases where it is judged that there is no fault with the communication control circuit 410 and the fault is a path fault (S135: NO), the controller 110 closes the path (S133). In cases where it is judged that the fault is a fault with the communication control circuit 410 (S135: YES), the controller 110 closes all the paths extending from the communication control circuit 410 and acknowledges that the fault lies with the communication control circuit 410 (S138). The controller 110 then outputs an alarm to the management device 14 in order to urge the user to exchange the switch box 400 early (S139).

However, after individually closing the fault paths (S133), the controller 110 judges whether all the paths extending from the communication control circuit 410 have been closed (S136). Incases where all the paths have been closed (S136: YES), the controller 110 judges that the fault is a fault with the communication control circuit 410 (S138) and outputs an alarm (S139). Because the respective paths (L3) extending from the communication control circuit 410 are already closed in cases where there is a transition from S136 to S138, there is no need to perform path closure in S138.

In cases where only some of the paths have been closed (S136: NO), the controller 110 outputs a warning to the management device 14 to appeal to the user regarding the requirement to perform maintenance exchange (S137). At this point, because the disk drive 230 is accessible by using an alternate path or the like, the storage control device is operating normally. However, because the redundancy has failed for the closed path, a maintenance exchange is preferable.

As mentioned earlier, in cases where the storage control device of this embodiment detects the occurrence of a fault, the fault occurrence point can be specified. Further, a warning or alarm is output to the management device 14 and the state of the storage control device can be reported to the user.

FIG. 29 is an explanatory diagram showing a screen G1 for reporting the state of the storage control device to the user in table format. This state confirmation screen G1 comprises state display sections G11 to G13 for each device (switch box, enclosure, PDB).

The respective state display sections G11 to G13 display information identifying the device, whether the operating state of the overall device is good or bad, the individual operating states and power savings states of each of the constituent elements in the device, information on the connection destination part, and the power savings states and so forth of the connection destination part, for example.

Figure 30:
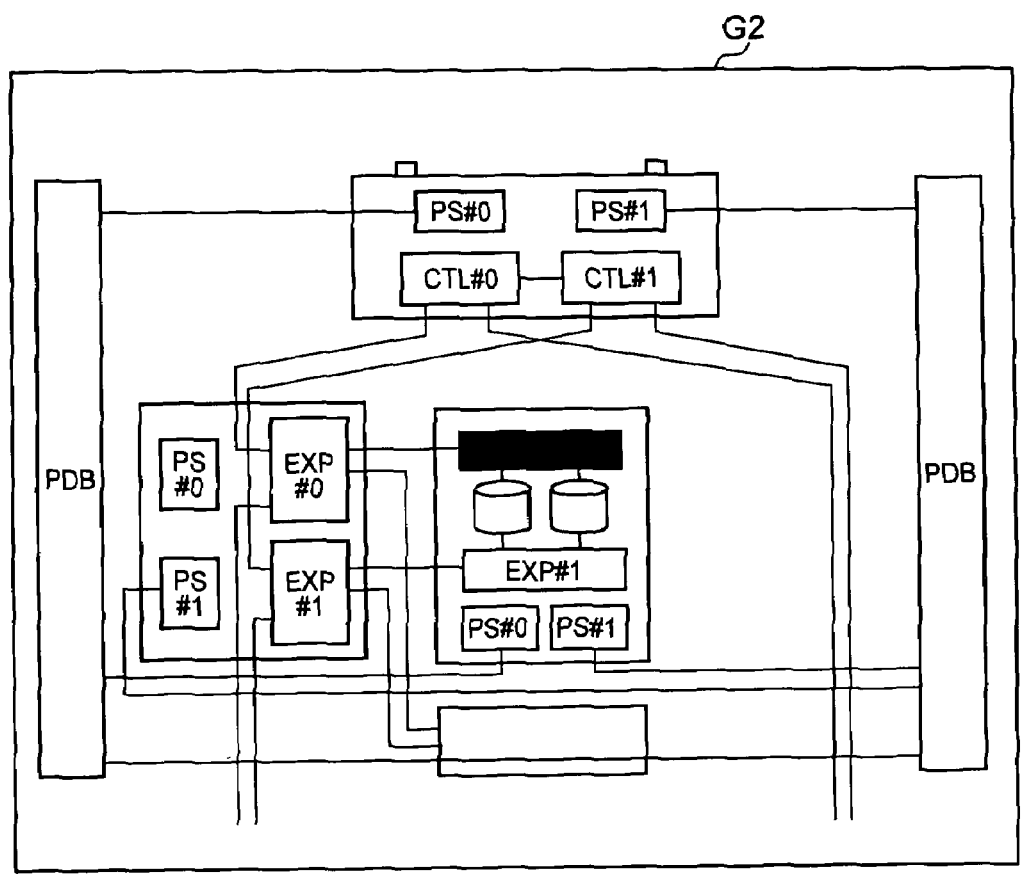
FIG. 30 is another example of a screen showing the states of the respective parts of the storage control device.

FIG. 30 is an explanatory diagram showing the screen G2 for graphically displaying the state of the storage control device. This state confirmation screen G2 renders the constitution of the storage control device in graphic form and shows the states of the respective devices using display colors or the like. For example, the devices required for maintenance exchange or the constituent elements are displayed colored in red and the devices or constituent elements requiring an early exchange can be displayed such that same switch on and off.

According to an embodiment with such a constitution, because the base enclosure 100 and the respective additional enclosures 200 are switch-connected via the switch box 400, the supply of power to the respective enclosures can be individually controlled by using PDB 300. Further, in this embodiment, in cases where a fault occurs in communications via the switch box 400, the point where the fault occurs can be specified and the processing required for closure processing and the warning and so forth can be performed. Hence, user convenience improves.

Second Embodiment

A second embodiment of the present invention will now be described based on FIG. 31. Each of the following embodiments below including this embodiment pertain to modified examples of the first embodiment. In this embodiment, the PDB 300A is provided with an information collection function.

Figure 31:
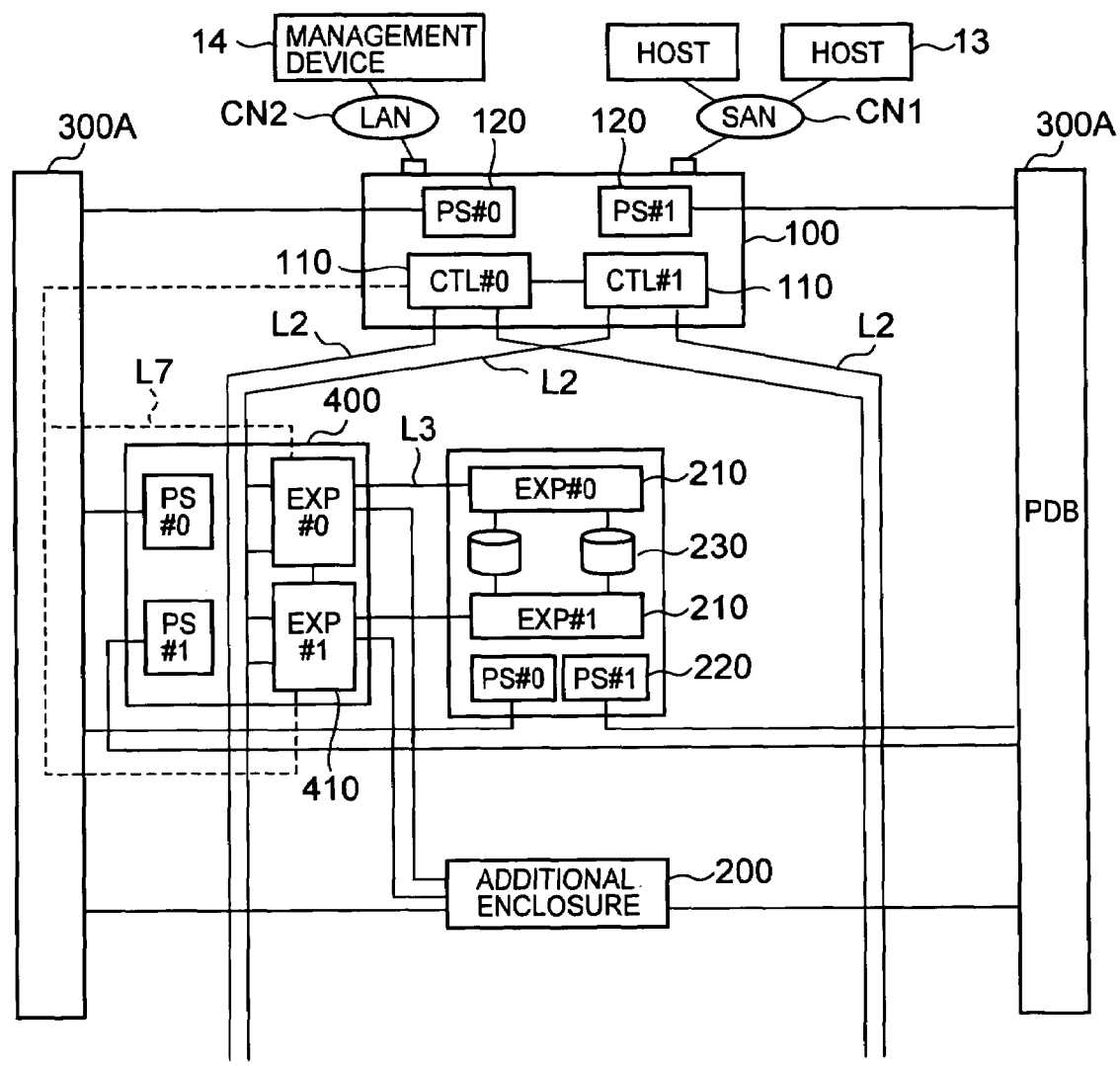
FIG. 31 is a block diagram that partially shows the constitution of the storage control device according to a second embodiment.

FIG. 31 is a block diagram that partially shows the constitution of the storage control device of this embodiment. The PDB 300A connects the respective communication control circuits 410 in the switch box 400 and the controller 110 by means of a communication line L7. For the sake of expedience in the description, only the PDB 300A on the left side of FIG. 31 is shown but there is also a PDB 300A on the right side. The communication line L7 can be constituted as a LAN, for example. The controller 110 is able to obtain the states of the respective communication control circuits 410 via communication line L7.

The constitution may also be such that communication is performed between the respective communication control circuits 410 in the switch box 400 and the controller 110 by means of Power Line Communications (PLC) via a PDB.

Third Embodiment

Figure 32:
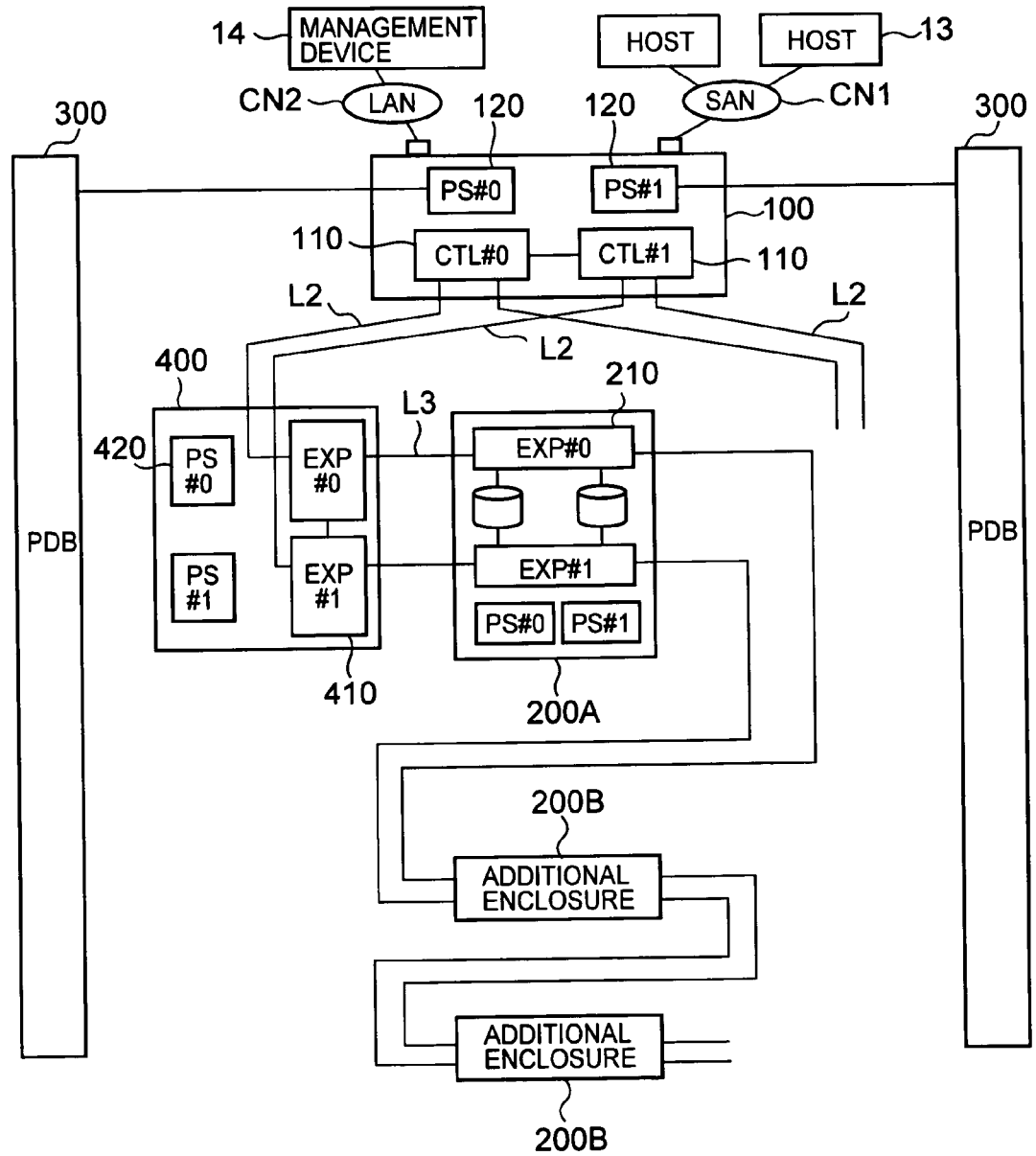
FIG. 32 is a block diagram that partially shows the constitution of the storage control device according to a third embodiment.

FIG. 32 is an explanatory diagram that schematically shows the connection constitution of the storage control device according to the third embodiment. The additional enclosures 200 of this embodiment can be broadly classified into upper enclosures 200A and lower enclosures 200B. The upper enclosures 200A are switch-connected to the base enclosure 100 via the switch box 400 as mentioned in the first embodiment above. The lower enclosures 200B have a daisy chain connection with the upper enclosures 200A.

In this embodiment, the supply of power is controlled in daisy chain units. In other words, in cases where all of the disk drives 230 in the upper enclosures 200A and in all of the lower enclosures 200B linked to the upper enclosures 200A have undergone spindown, the supply of power to the upper enclosures 200A and the respective lower enclosures 200B is stopped.

In this embodiment, the units for controlling the power supply are larger than those of the first embodiment but a switch connection using a switch box 400 can be relatively easily introduced to an existing storage control device that uses a daisy chain connection.

The present invention is not limited to the above embodiments. A person skilled in the art is able to make a variety of additions and changes and so forth within the scope of the present invention. Each of the embodiments can be suitably combined, for example.

What is claimed is:

1. A storage control device having a plurality of enclosures, comprising:
    a first enclosure for inputting and outputting data to and from a storage device in accordance with an access request from a higher-level device;
    one or more second enclosure each comprising the storage device and operating in accordance with an instruction from the first enclosure;
    an inter-enclosure connection switch that switch-connects the first enclosure and each of the second enclosures; and
    a power supply circuit section that supplies power individually to the first enclosure, each of the second enclosures, and the inter-enclosure connection switch respectively, wherein
    the first enclosure comprises an upper communication section for communicating with the higher-level device; a lower communication section for communicating with each of the second enclosures via the inter-enclosure connection switch; a constitution information management section that manages information relating to the constitution of the first enclosure and each of the second enclosures; a power control section that uses the constitution information to control a start or stoppage of the power to each of the second enclosures or the inter-enclosure connection switch; and a fault diagnosis section that detects and diagnoses a fault relating to communication between the lower communication section and each of the second enclosures.

2. The storage control device according to claim 1, wherein the constitution information includes at least spin states of each of the storage devices and power savings states of each of the second enclosures and the inter-enclosure connection switch; and
    the power control section references the constitution information upon initial startup when power is to be supplied to all of the second enclosures and the inter-enclosure connection switch, supplies power only to each of the second enclosures and the inter-enclosure connection switch which have not been set to the power savings state, and does not supply power to each of the second enclosures and the inter-enclosure connection switch which have been set to the power savings state.

3. The storage control device according to claim 1, wherein the constitution information includes at least the states indicating the constitution of the connection from the first enclosure to the storage devices in each of the second enclosures via the inter-enclosure switch,
    the fault diagnosis section comprises:
    a fault detection section that detects a communication-related fault that is produced in any diagnosis target device of the inter-enclosure connection switch and each of the second enclosures;
    a specifying section that specifies a point where the fault has occurred by using the constitution information; and
    a reporting section that issues a report relating to the specified fault.

4. The storage control device according to claim 3, wherein (1) a communication path extending from the first enclosure to each of the storage devices is made redundant by a primary path and secondary path;

(2) the inter-enclosure connection switch and each of the second enclosures each comprise (2-1) a power source circuit to which power is supplied from the power supply circuit; (2-2) a primary control substrate which is driven by the power output by the power source circuit and which is connected to the primary path; (2-3) a secondary control substrate which is driven by the power output by the power source circuit and is connected to the secondary path; and (2-4) a control line which is provided between the primary control substrate and the secondary control substrate and which is for mutually connecting the primary and secondary paths;

(3) in cases where the fault is detected by the fault detection section, the specifying section (3-1) attempts access via the secondary path to the diagnosis target device in which the fault has been detected; (3-2) investigates the power output state of the power supply circuit section connected to the power source circuit in the diagnosis target device in cases where the specifying section cannot access the diagnosis target device via the secondary path; (3-2-1) judges that a fault lies with the power supply circuit in cases where power is not being output normally from the power supply circuit section; (3-2-2) judges that a fault lies with the power source circuit in the diagnosis target device in cases where power is being output normally from the power supply circuit; (3-3) investigates whether the primary path can be used via the control line from the secondary path in cases where the specifying section can access the diagnosis target device via the secondary path; (3-3-1) examines whether the voltage in the diagnosis target device is normal in cases where the primary path cannot be used even via the control line, judges that a fault lies with the communication control circuit in the diagnosis target device in cases where the voltage is normal; judges that a fault lies with the power source circuit in the diagnosis target device or with a power supply path from the power source circuit to the communication control circuit in cases where the voltage is not normal; and (3-3-2) judges that the fault is a link fault in cases where the primary path can be used via the control line.

5. The storage control device according to claim 4, wherein, (4) in cases where judgment is made that the fault is the link fault, the specifying section (4-1) performs a first internal loop-back test by using the primary path and, in cases where a response is obtained by the first internal loop-back test, judges that a fault lies with the path between the connection destination device connected to the diagnosis target device and the diagnosis target device; (4-2) performs a second loop-back test by using the secondary path in cases where a response is not obtained as a result of the first internal loop-back test, judges that a fault lies with the communication control circuit in the diagnosis target device in cases where a response is not obtained as a result of the second internal loop-back test, and judges that a fault has occurred in the path between the diagnosis target device and the first enclosure in cases where a response is obtained as a result of the second internal loop-back test.

6. The storage control device according to claim 1, wherein the first enclosure is connected to a plurality of the second enclosures via a cascade-connected plurality of the inter-enclosure connection switches.

7. The storage control device according to claim 1, wherein
each of the second enclosures can be categorized into an upper second enclosure and a lower second enclosure;
the upper second enclosure has a star connection with the first enclosure via the inter-enclosure connection switch; and
the lower second enclosure has a daisy-chain connection with the upper second enclosure.

8. The storage control device according to claim 1, wherein the power control section (1) stops power supply to second enclosures for which all the storage devices in those enclosures have shifted to a power savings mode, among each of the second enclosures, and (2) re-opens the power supply to the second enclosures for which the power supply has stopped in response to an access request that is issued by the higher-level device.

* * * * *